(12) United States Patent
Ryu et al.

(10) Patent No.: US 11,549,310 B2
(45) Date of Patent: Jan. 10, 2023

(54) FOLDABLE BALCONY BALUSTRADE-COMBINED FIRE/DISASTER EVACUATION FACILITY

(71) Applicant: Korea Institute of Civil Engineering and Building Technology, Gyeonggi-do (KR)

(72) Inventors: Soon Mo Ryu, Gyeonggi-do (KR); Jae Sik Kang, Incheon (KR)

(73) Assignee: Korea Institute of Civil Engineering and Building Technology, Goyang-si Gyeonggi-do (KR)

( * ) Notice: Subject to any disclaimer, the term of this patent is extended or adjusted under 35 U.S.C. 154(b) by 410 days.

(21) Appl. No.: 16/641,506

(22) PCT Filed: Apr. 26, 2018

(86) PCT No.: PCT/KR2018/004825
§ 371 (c)(1),
(2) Date: Feb. 24, 2020

(87) PCT Pub. No.: WO2019/045219
PCT Pub. Date: Mar. 7, 2019

(65) Prior Publication Data
US 2021/0131184 A1    May 6, 2021

(30) Foreign Application Priority Data
Aug. 30, 2017 (KR) .................. 10-2017-0109770

(51) Int. Cl.
*E06C 9/10* (2006.01)
*E04F 11/18* (2006.01)
(Continued)

(52) U.S. Cl.
CPC .............. *E06C 9/10* (2013.01); *E04F 11/181* (2013.01); *E06C 7/006* (2013.01); *E06C 7/183* (2013.01); *E06C 7/50* (2013.01); *F16M 13/02* (2013.01)

(58) Field of Classification Search
CPC .......... E06C 9/10; E06C 7/006; E04F 11/181; E04F 2011/1825; F16M 13/02; A62B 5/00; A62B 1/00; E04C 9/10; E04C 7/18
See application file for complete search history.

(56) References Cited

U.S. PATENT DOCUMENTS 748,305 A  *  12/1903  Parvin et al. ............ A62B 5/00
                                                          182/84
1,447,182 A  *   3/1923  Roberts .................... A62B 1/20
                                                          248/240.1
(Continued)

FOREIGN PATENT DOCUMENTS

KR    1020100071905 A    6/2010
KR       100998240 B1   12/2010
(Continued)

*Primary Examiner* — Brian D Mattei
*Assistant Examiner* — Kathleen M. McFarland
(74) *Attorney, Agent, or Firm* — Schroeder Law PC

(57) ABSTRACT

The present invention relates to a facility comprising: a fixed frame fixedly installed on an outer wall of a veranda or a balcony of a high-rise building; a foldable evacuation box which can be unfolded in the form of a rectangular parallelepiped having an open top side and has and evacuation door on a side thereof; a fall prevention and evacuation means which can be structurally changed to an emergency stairway for fire evacuation; an evacuation box locking means which allows the foldable evacuation box to be unfolded in a rectangular parallelepiped form; a locking means which holds and fixes the fall prevention and evacuation means to the fixed frame; and an entry prevention door which prevents an evacuee from entering inside a veranda or (Continued)

a balcony from the foldable evacuation box through the fixed frame.

5 Claims, 18 Drawing Sheets

(51) Int. Cl.
  *E06C 7/00* (2006.01)
  *E06C 7/18* (2006.01)
  *E06C 7/50* (2006.01)
  *F16M 13/02* (2006.01)

(56) References Cited

U.S. PATENT DOCUMENTS

| | | | | |
|---|---|---|---|---|
| 1,455,928 A * | 5/1923 | Morrill | | E06C 9/08 |
| | | | | 182/86 |
| 1,488,624 A * | 4/1924 | Sperl | | E06C 9/085 |
| | | | | 182/83 |
| 2,101,053 A * | 12/1937 | Della Santina | | E06C 9/08 |
| | | | | 182/106 |
| 3,838,750 A * | 10/1974 | Williams, Jr. | | A62B 1/20 |
| | | | | 182/74 |
| 3,848,698 A * | 11/1974 | Kanbe | | A62B 1/20 |
| | | | | 182/83 |
| 4,090,585 A * | 5/1978 | Laub | | E04B 1/003 |
| | | | | 182/47 |
| 4,109,760 A * | 8/1978 | Marra | | A62B 1/20 |
| | | | | 182/48 |
| 4,582,166 A * | 4/1986 | Baker | | A62B 1/20 |
| | | | | 182/48 |
| 5,103,591 A * | 4/1992 | Szymanski | | A62B 5/00 |
| | | | | 49/141 |
| 5,103,934 A * | 4/1992 | Brooks | | E04F 11/068 |
| | | | | 182/86 |
| 5,303,799 A * | 4/1994 | Tsai | | E06C 9/10 |
| | | | | 182/74 |
| 6,598,706 B1 * | 7/2003 | Takeuchi | | E06C 9/10 |
| | | | | 182/141 |
| 11,125,383 B1 * | 9/2021 | Fong | | E04G 3/18 |
| 2008/0035425 A1 * | 2/2008 | Meitus | | B66B 7/10 |
| | | | | 182/129 |
| 2009/0272046 A1 * | 11/2009 | Letscher, III | | E04B 1/34336 |
| | | | | 52/745.02 |
| 2010/0025156 A1 * | 2/2010 | Lewis | | A62B 5/00 |
| | | | | 49/31 |
| 2018/0298692 A1 * | 10/2018 | Kim | | A62B 5/00 |
| 2020/0024820 A1 * | 1/2020 | Madruga | | E06B 5/01 |
| 2020/0087932 A1 * | 3/2020 | Phan | | B66F 11/04 |
| 2020/0254287 A1 * | 8/2020 | Ren | | A62B 1/20 |
| 2021/0131184 A1 * | 5/2021 | Ryu | | E04F 11/181 |
| 2021/0301540 A1 * | 9/2021 | Kim | | E04F 11/1865 |
| 2021/0355695 A1 * | 11/2021 | Lyras | | E04F 11/1865 |

FOREIGN PATENT DOCUMENTS

| | | |
|---|---|---|
| KR | 1020110079935 A | 7/2011 |
| KR | 101562205 B1 | 10/2015 |
| KR | 1020170027206 A | 3/2017 |

\* cited by examiner

FOLDABLE BALCONY BALUSTRADE-COMBINED FIRE/DISASTER EVACUATION FACILITY

TECHNICAL FIELD

The present invention relates to a foldable balcony balustrade-combined fire/disaster evacuation facility, more specifically to the foldable balcony balustrade-combined fire/disaster evacuation facility that is installed in a veranda or a balcony and is used as a safety balustrade to prevent falling in ordinary day without fire risk, and is structurally changed to an emergency stairway for fire/disaster evacuation to move to the lower floor direction when the fire occurs.

BACKGROUND ART

Commonly, a high-rise buildings are increasing in the present day in order to make effective use of a small site and to expand a living space of the building. A main entrance door for human access is usually prepared in the high-rise buildings, a veranda is installed in the opposite side of the main entrance door, and a safety parapet for preventing falling is installed on the veranda.

Such high-rise buildings have an advantage of being able to accommodate a large number of people in the small site, and it is possible to look down the scenery in the high building, and have an advantage of having various convenience facilities inside.

However, the high-rise buildings have a disadvantage of having a high frequency of fires due to the residence of many people inside the buildings soared on the small site, and have a problem that once a fire occurred, it could lead to a mass mortality damage.

Meanwhile, there is a way to avoid the fire by using a descending life line installed in the veranda to solve this problem. However, the descending life line has a problem that is difficult for the general public to operate it, and the other problem of the descending life line is that people cannot overcome their anxiety of using the descending life line in addition to their fear of fire because of the burden of putting the weight of the user on one rope.

Meanwhile, as a prior art of this invention, "A safety balustrade for fire-escaping" of Korean patent registration number "10-0927317" has been filed and registered. The safety balustrade for fire-escaping may consist of: a first frame blocking the upper glass wall in ordinary day without fire risk, and being pivoted by a hinge fixed to the outer wall of the building and facing the lower glass wall or the lower outer wall in the event of fire; a second frame being placed between the first frame and the upper glass wall to block the upper glass wall in ordinary day without fire risk, and being pivoted to direction of the lower glass wall or the lower outer wall along the first frame in the event of fire; a stepping board, wherein its two ends of one side and two ends of the other side are connected to the first frame and the second frame respectively and it is erected abreast with the upper glass wall to prevent falling accident of upper floor residents in ordinary day without fire risk, and when the first frame and the second frame are pivoted to the direction of the lower glass wall and the lower outer wall, the stepping board is unfolded in the orthogonal direction between the first frame and the second frame in a state of being connected to the first frame and the second frame to provide a stepping space at the same time as widening the gap between the first frame and the second frame; and fixing means which fixes the one side of the second frame to the upper building structure for the first frame and the second frame not to be pivoted to the lower glass wall or the lower outer wall by the hinge in ordinary day without fire risk.

However, the above structure had a problem that residents of an upper floor may come into a veranda or a balcony of a lower floor, steal money and valuables or threaten his/her body when the structure is axially rotated to the downstairs direction, and then is structurally changed to the emergency stairway for fire evacuation.

DISCLOSURE

Technical Problem

An objective of the present invention is to solve such problems and to provide the foldable balcony balustrade-combined fire/disaster evacuation facility which allows people who are isolated in the high-rise building to descend safely to the ground through the veranda or the balcony when the fire occurs in a high-rise building and the main entrance door is shut down.

Also, another objective of the present invention is to provide the foldable balcony balustrade-combined fire/disaster evacuation facility which prohibits residents of an upper floor from entering inside of a lower floor through the emergency stairway for fire/disaster evacuation without permission of a resident of the lower floor when the present invention is structurally changed to the emergency stairway for fire/disaster evacuation in ordinary day without fire risk.

Technical Solution

In order to achieve the above objects, a foldable balcony balustrade-combined fire/disaster evacuation facility comprises: a fixed frame which is a quadrangle frame shape and is fixedly installed on an outer wall of a veranda or a balcony of a high-rise building; a foldable evacuation box which is overlapped with the fixed frame and prevents a falling accident of residents who live in the high-rise building in ordinary day without fire risk, and is unfolded in a rectangular parallelepiped form having an open top side and has an evacuation door on a side thereof when a fire occurs; a fall prevention and evacuation means which is installed to a left side or right side of the fixed frame and a lower end thereof is fixed to an outside of the high-rise building by a hinge means, in ordinary day without fire risk, it is used as a safety balustrade to prevent falling as a rear side thereof comes in contact with the outside of the high-rise building, and when the fire occurs it is axially rotated by 180 degrees in a lower direction of the high-rise building by the hinge means, thereby is structurally changed to an emergency stairway for fire evacuation; an evacuation box locking means which holds and fixes the foldable evacuation box to the fixed frame for the foldable evacuation box not to be unfolded to a rectangular parallelepiped form in ordinary day without fire risk, but which releases the foldable evacuation box being held and allows the foldable evacuation box to be unfolded in a rectangular parallelepiped form in case that a lever is operated or collides with the fall prevention and evacuation means that is axially rotated from an upper floor to a lower floor when the fire occurs; and a locking means which holds and fixes the fall prevention and evacuation means to the fixed frame for the fall prevention and evacuation means not to be axially rotated by 180 degrees in a lower direction of the high-rise building by the hinge means in ordinary day without fire risk; and an entry preventing door which is installed to the fixed frame and prevents an evacuee descending from an upper floor from entering inside of the veranda or the balcony through the fixed frame from the foldable evacuation box. Meanwhile, in ordinary day without fire risk, the foldable evacuation box is overlapped with the fixed frame, and the fall prevention and evacuation means stands to an outer wall of the veranda or the balcony to prevent a falling accident of residents; when the fire occurs, in case that the lever installed to the evacuation box locking means is operated or the fall prevention and evacuation means installed in the upper floor is axially rotated to a direction of a lower floor, the foldable evacuation box is unfolded in a rectangular parallelepiped form; in case that the locking means is released, the fall prevention and evacuation means is axially rotated by 180 degrees to the direction of the lower floor and is structurally changed to the emergency stairway for fire evacuation, and residents who live in a current floor open the entry preventing door and enter the foldable evacuation box installed in the current floor and repeat a process of moving to the foldable evacuation box of the lower floor through the fall prevention and evacuation means which is installed in the current floor and is structurally changed to the emergency stairway for fire evacuation, thereby descend to the ground and can avoid the risk of fire.

Advantageous Effects

A foldable balcony balustrade-combined fire/disaster evacuation facility according to the present invention comprising these structures enables a person who is isolated in a high-rise building to descend safely to the ground through a veranda or a balcony when a fire occurs in the high-rise building and a main entrance door is shut down.

Also, the present invention may prevent thefts or body threats by a sexual harasser because an upper floor resident cannot enter inside of a lower floor without permission of the lower floor resident when the present invention is structurally changed to an emergency stairway for fire/disaster evacuation in ordinary day without fire risk.

Figure 1:
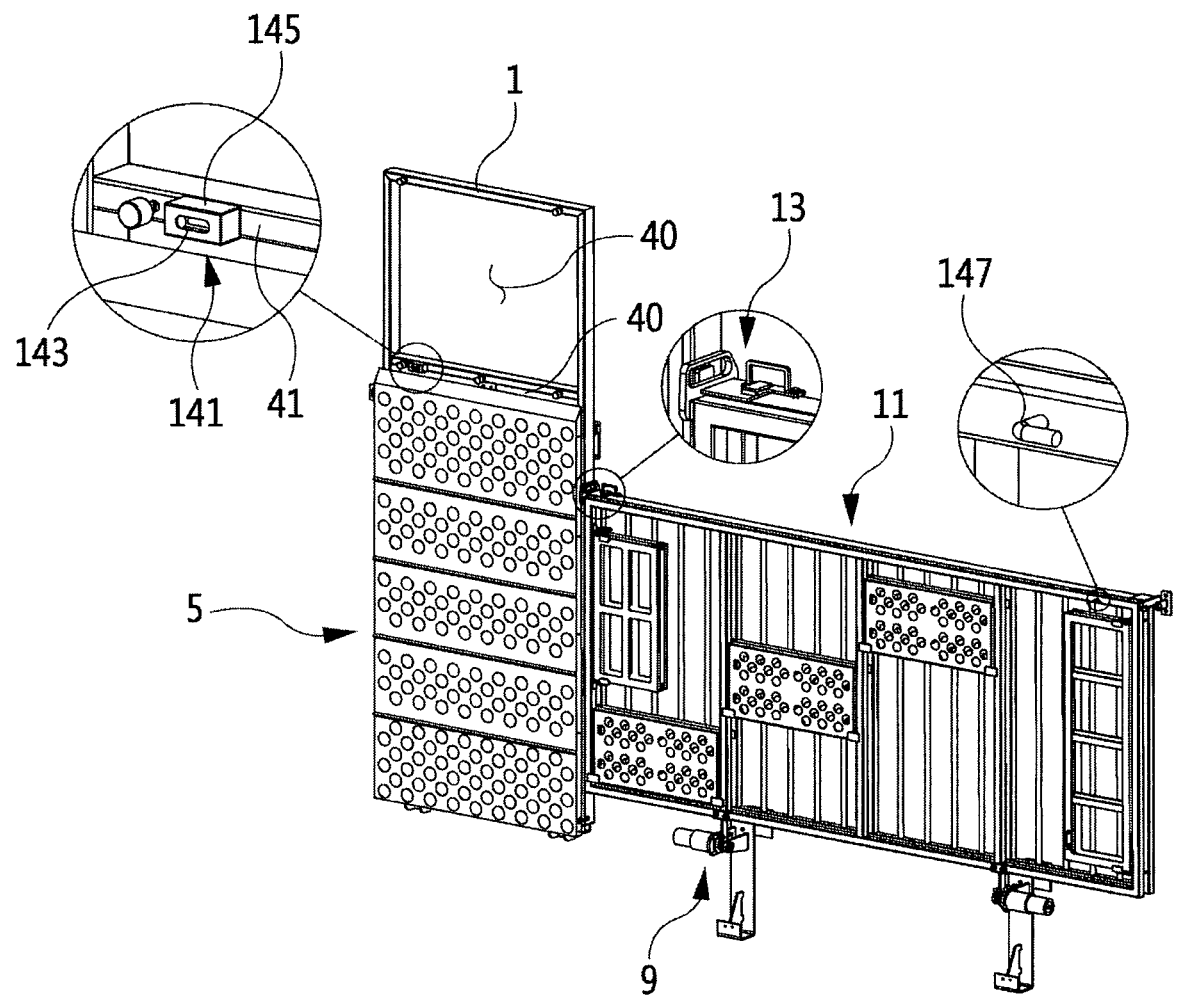
FIG. 1 illustrates the present invention which is used as a safety balustrade for preventing falling in ordinary day without fire risk.

DESCRIPTION OF SYMBOLS 1. a fixed frame
3. an evacuation door
5. a foldable evacuation box
7. an evacuation box locking means
9. a hinge means
11. a fall prevention and evacuation means
13. a locking means
15. an entry preventing door
21. a fall preventing plate
23. a front moving frame
25. a foldable foothold
27. a foldable side wall
29. a foothold for a front evacuation box
31. a foothold for a rear evacuation box
33. a hinge for a foldable foothold
35. a side wall for a front evacuation box
37. a side wall for a rear evacuation box
39. a hinge for a foldable side wall
41. a top horizontal bar
43. a bottom horizontal bar
53. a guide frame
55. a first foothold
57. a second foothold
59. a foot-stepping means
61. a first side plate
63. a second side plate
65. a side folding plate
67. one side fixing bar
69. a locking arm
71. a second locking hook
73. one side fixing piece
75. the other side fixing bar
77. a third locking hook
79. the other side fixing piece
85. the other side 'ㄱ'-shaped iron piece
87. a lock handle
89. a lock handle holder
91. a wall fixing bracket
93. a shaft fixing hole
95. a shaft fixing bracket
97. a shaft
99. a reducer
101. a hanger frame hold arm
103. a rotator bracket
105. an end cap
107. a fixing bolt
109. a hold arm engaging protrusion
111. an anti-interference ring
113. a shock absorbing bracket
115. an impact shock absorbing member
117. a reinforcing piece
119. a 'ㄱ'-shaped bracket
121. a concrete step portion
123. a vertical direction guide angle frame
125. a 'ㄱ'-shaped hinge bracket
127. a vertical direction hanger angle frame 129. a foot-stepping means stopping plate
131. a side folding plate hinge bracket
133. a side folding plate stopper
135. a folding preventing means
137. an anti-folding lock handle
139. an anti-folding L-shaped latch
141. a fall prevention and evacuation means holder
143. a long hole
145. a L-shaped latch fitting portion
147. a L-shaped latch
149. a U-shaped ring
151. a ring-shaped step portion
153. a shock absorbing rubber
155. a push bar
157. a vertical plate
159. a movable arm passing hole
161. a rear bracket
163. a 'ㄷ'-shaped groove
165. a front bracket
167. a push bar passing hole
169. a lever
171. a movable arm
173. a triangle locking protrusion
175. a L-shaped locking piece
177. a triangle locking groove
179. a first locking hook
181. a U-shaped ring catch piece
183. a torsion spring

MODE FOR INVENTION

Hereinafter, the present invention will be described in detail with reference to the accompanying drawings.

Figure 2:
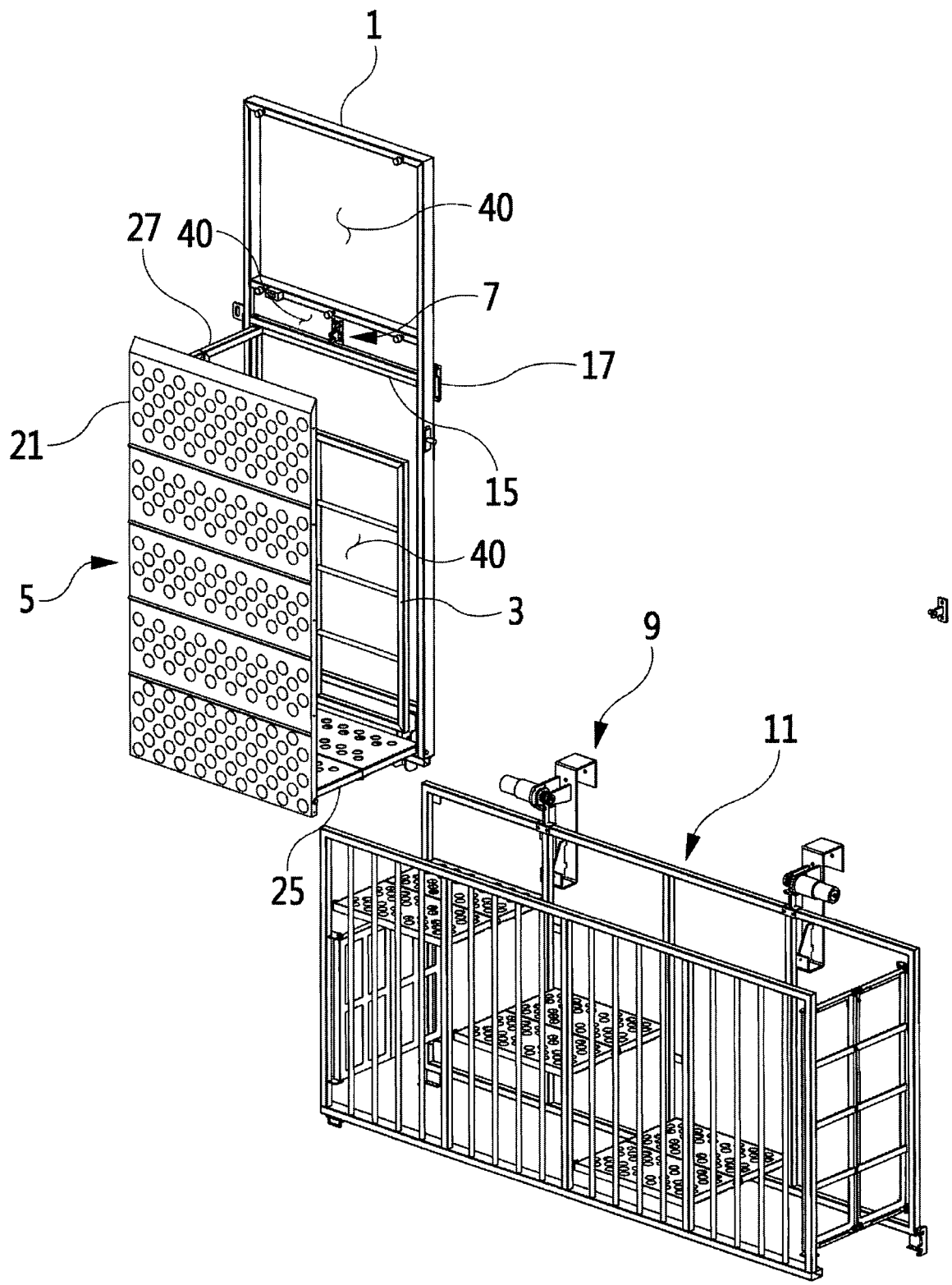
FIG. 2 illustrates a state in which the present invention is structurally changed to an emergency stairway for fire evacuation when the fire occurs.

As shown in FIGS. 1 and 2, a foldable balcony balustrade-combined fire/disaster evacuation facility according to the present invention comprises a fixed frame (1) which is a quadrangle frame shape and is fixedly installed on an outer wall of a veranda or a balcony of a high-rise building; a foldable evacuation box (5) which is overlapped with the fixed frame (1) and prevents a falling accident of residents who live in the high-rise building in ordinary day without fire risk, and is unfolded in a rectangular parallelepiped form having an open top side and has an evacuation door (3) on a side thereof when a fire occurs; a fall prevention and evacuation means (11) which is installed to a left side or right side of the fixed frame (1) and a lower end thereof is fixed to an outside of the high-rise building by a hinge means (9), in ordinary day without fire risk, it is used as a safety balustrade to prevent falling as a rear side thereof comes in contact with the outside of the high-rise building, and when the fire occurs it is axially rotated by 180 degrees in a lower direction of the high-rise building by the hinge means (9), thereby is structurally changed to an emergency stairway for fire evacuation; an evacuation box locking means (7) which holds and fixes the foldable evacuation box (5) to the fixed frame (1) for the foldable evacuation box (5) not to be unfolded to a rectangular parallelepiped form in ordinary day without fire risk, but which releases the foldable evacuation box (5) being held and allows the foldable evacuation box (5) to be unfolded in a rectangular parallelepiped form in case that a lever (169) is operated or collides with the fall prevention and evacuation means (11) that is axially rotated from an upper floor to a lower floor when the fire occurs; and a locking means (13) which holds and fixes the fall prevention and evacuation means (11) to the fixed frame (1) for the fall prevention and evacuation means (11) not to be axially rotated by 180 degrees in a lower direction of the high-rise building by the hinge means (9) in ordinary day without fire risk; and an entry preventing door (15) which is installed to the fixed frame (1) and prevents an evacuee descending from an upper floor from entering inside of the veranda or the balcony through the fixed frame (1) from the foldable evacuation box (5); wherein, in ordinary day without fire risk, the foldable evacuation box (5) is overlapped with the fixed frame (1), and the fall prevention and evacuation means (11) stands to an outer wall of the veranda or the balcony to prevent a falling accident of residents.

Meanwhile, when the fire occurs, in case that the lever (169) installed to the evacuation box locking means (7) is operated or the fall prevention and evacuation means (11) installed in the upper floor is axially rotated to a direction of a lower floor, the foldable evacuation box (5) is unfolded in a rectangular parallelepiped form; in case that the locking means (13) is released, the fall prevention and evacuation means (11) is axially rotated by 180 degrees to the direction of the lower floor and is structurally changed to the emergency stairway for fire evacuation, and residents who live in a current floor open the entry preventing door (15) and enter the foldable evacuation box (5) installed in the current floor and repeat a process of moving to the foldable evacuation box (5) of the lower floor through the fall prevention and evacuation means (11) which is installed in the current floor and is structurally changed to the emergency stairway for fire evacuation, thereby descend to the ground and can avoid the risk of fire.

Figure 3:
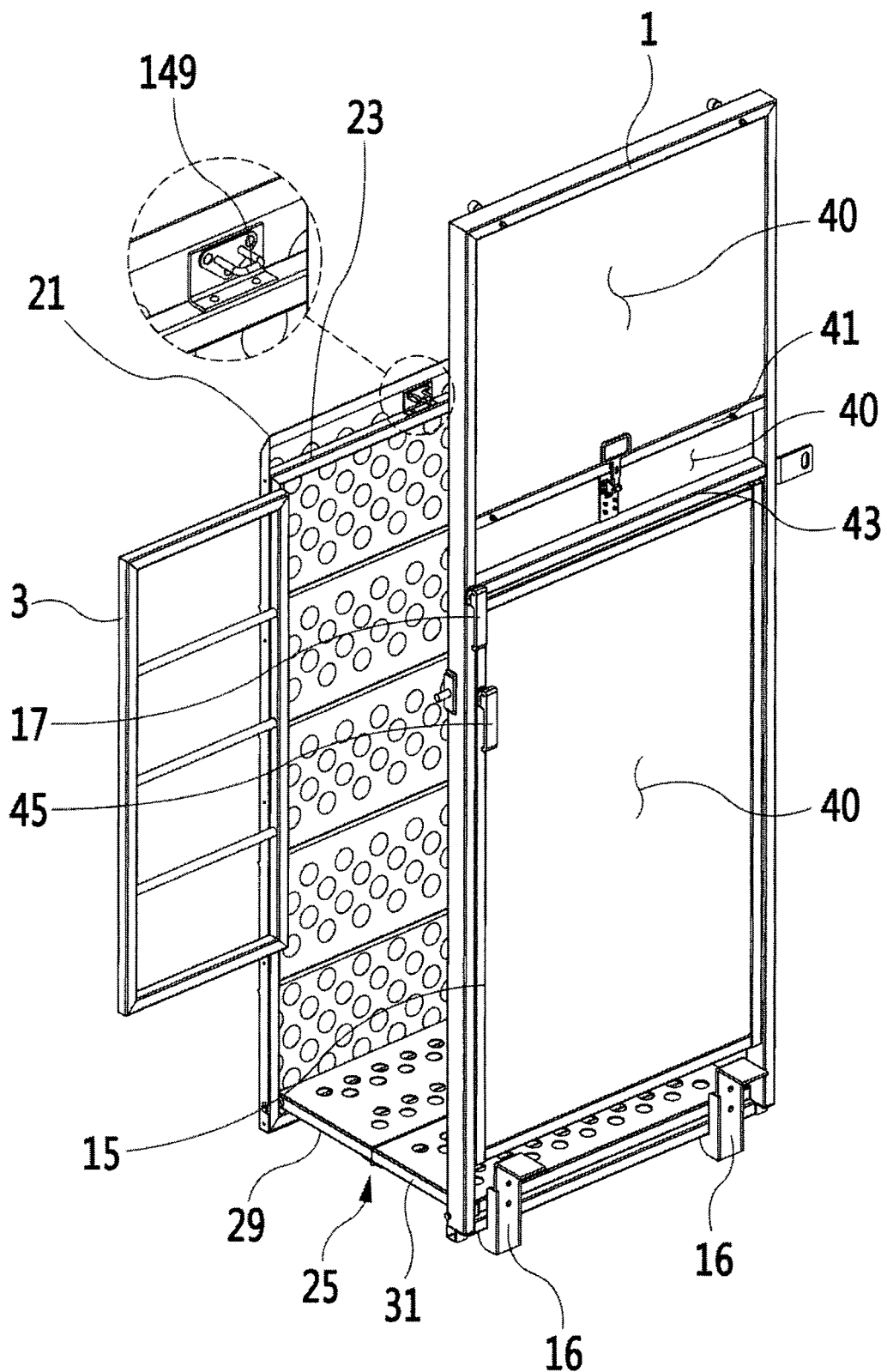
FIG. 3 and FIG. 4 are views looking at a foldable evacuation box from the rear-side of the foldable evacuation box.

As shown in FIG. 3, a fixed frame supporting bracket (16) which supports a lower side of the fixed frame (1) in a state of being fixed to a front side of a bottom of a veranda or a balcony is further mounted to a lower portion of the fixed frame (1).

Also in the present invention, in case that the foldable evacuation box (5) is installed to a left side of an upper floor and the fall prevention and evacuation means (11) is installed to a right side of the upper floor, the foldable evacuation box (5) is installed to a right side of a lower floor of the high-rise building and the fall prevention and evacuation means (11) is installed to a left side of the lower floor, while in case that the foldable evacuation box (5) is installed to the right side of the upper floor and the fall prevention and evacuation means (11) is installed to the left side of an upper floor, the foldable evacuation box (5) is installed to the left side of the lower floor and the fall prevention and evacuation means (11) is installed to the right side of the lower floor.

Therefore, when the fall prevention and evacuation means (11) installed to the upper floor is axially rotated to the lower floor direction, it collides with the evacuation box locking means (7).

Figure 4:
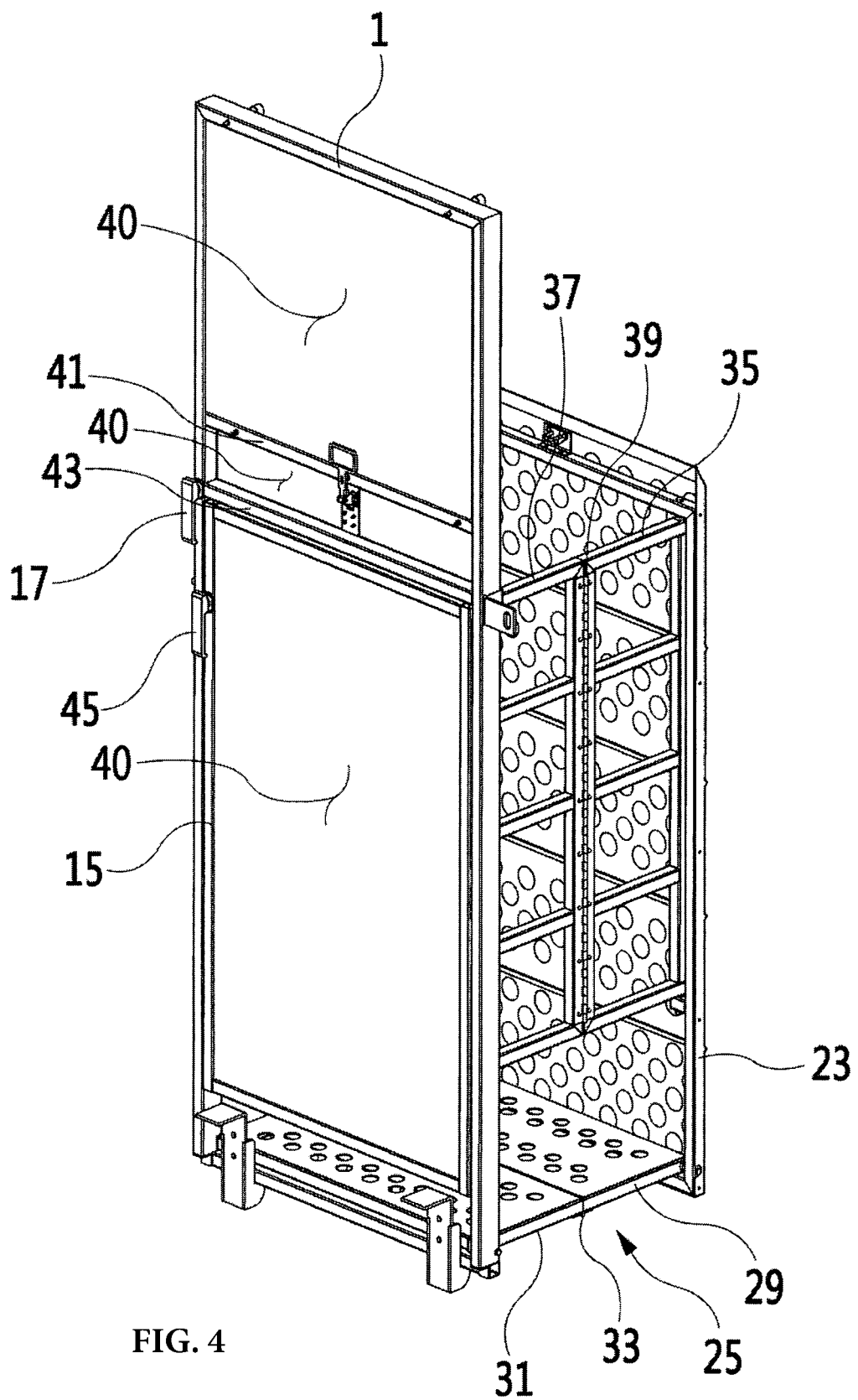

As shown in FIGS. 3 and 4, the foldable evacuation box (5) comprises: a front moving frame (23) which is a frame of rectangular form, wherein a fall preventing plate (21) is installed to a front side thereof; an evacuation door (3) which is hingedly connected to one side of the front moving frame (23) facing against the fall prevention and evacuation means (11); a foldable foothold (25) of which a front of both side is hingedly connected to a lower portion of the front moving frame (23), and of which a rear of both side is hingedly connected to a lower portion of the fixed frame (1), wherein it is folded and stands in a vertical direction between the front moving frame (23) and the fixed frame (1) which are facing each other when a locking of the evacuation box locking means (7) is not released, but it is unfolded in a horizontal direction when the locking of the evacuation box locking means (7) is released and the front moving frame (23) moves to a front direction; and a foldable side wall (27)

of which an upper and a lower portions of a front direction are hingedly connected to the other side of the front moving frame (23) to which the evacuation door (3) is not installed, and of which an upper and a lower portions of a rear direction are hingedly connected to the other side of the fixed frame (1) which is faced to the other side of the front moving frame (23) in a front and a rear direction, wherein it is folded between the front moving frame (23) and the fixed frame (1) which are facing each other when the locking of the evacuation box locking means (7) is not released, but it is unfolded to a linear form in a state of standing in a vertical direction when the locking of the evacuation box locking means (7) is released and the front moving frame (23) moves to a front direction.

As shown in FIGS. 3 and 4, the foldable foothold (25) comprises a foothold for a front evacuation box (29) of which front direction of both sides is hingedly connected to a lower portion of the front moving frame (23); a foothold for a rear evacuation box (31) of which rear direction of both sides is hingedly connected to a lower portion of the fixed frame (1); and a hinge for a foldable foothold (33) which is installed to a lower end of a rear side of the foothold for a front evacuation box (29) and to a lower end of a front side of a foothold for a rear evacuation box (31), and makes the foothold for a front evacuation box (29) and the foothold for a rear evacuation box (31) be unfolded in a linear form or be overlapped; and in ordinary day without fire risk, the foothold for a front evacuation box (29) and the foothold for a rear evacuation box (31) are folded (stacked) by the hinge for a foldable foothold (33), thereby they are overlapped between the front moving frame (23) and the fixed frame (1), while when the fire occurs, in case that a locking of the evacuation box locking means (7) is released, the front moving frame (23) is moved in a front direction, and the foothold for a front evacuation box (29) and the foothold for a rear evacuation box (31) are unfolded in a horizontal direction by the hinge for a foldable foothold (33).

As shown in FIGS. 3 and 4, the foldable side wall (27) comprises a side wall for a front evacuation box (35) of which upper and lower portion of a front direction are hingedly connected to the front moving frame (23); a side wall for a rear evacuation box (37) of which upper and lower portion of a rear direction is hingedly connected to the fixed frame (1); and a hinge for a foldable side wall (39) which is installed to a rear end of the side wall for a front evacuation box (35) and a front end of the side wall for a rear evacuation box (37), and makes the side wall for a front evacuation box (35) and the side wall for a rear evacuation box (37) be unfolded in a linear form or be overlapped; and in ordinary day without fire risk, the side wall for a front evacuation box (35) and the side wall for a rear evacuation box (37) is folded (stacked) by the hinge for a foldable side wall (39), thereby they are overlapped between the front moving frame (23) and the fixed frame (1), while when the fire occurs, in case that a locking of the evacuation box locking means (7) is released, the front moving frame (23) is moved to a front direction, and the side wall for a front evacuation box (35) and the side wall for a rear evacuation box (37) are unfolded in a linear form by the hinge for a foldable side wall (39).

As shown in FIG. 3 and FIG. 4, a top horizontal bar (41) and a bottom horizontal bar (43) which have a predetermined height interval therebetween and are laid in a horizontal direction are installed inside of the fixed frame (1), and the entry preventing door (15) is installed to the fixed frame (1) which is disposed to a lower portion of the bottom horizontal bar (43).

A blocking plate (40) whose form is a mesh net or being plain is installed to prevent trespassing between an upper end of the fixed frame (1) and the top horizontal bar (41), and between the top horizontal bar (41) and the bottom horizontal bar (43), and to the entry preventing door (15).

An upper and a lower portion of one side of the entry preventing door (15), respectively, are axially fixed to a lower portion of the fixed frame (1) and the bottom horizontal bar (43), and are axially rotated, and an open handle (45) which is able to open the entry preventing door (15) is mounted to one side of the entry preventing door (15) that is facing against a balcony or a veranda.

Also, a door lock handle (17) which locks the entry preventing door (15) inside of a veranda or a balcony is further mounted to the fixed frame (1).

Therefore, inside of a balcony or a veranda, it is possible to release a locking of the door lock handle (17) and to open the entry preventing door (15), but inside of the evacuation box (5), it is not possible to open the entry preventing door (15).

Figure 5:
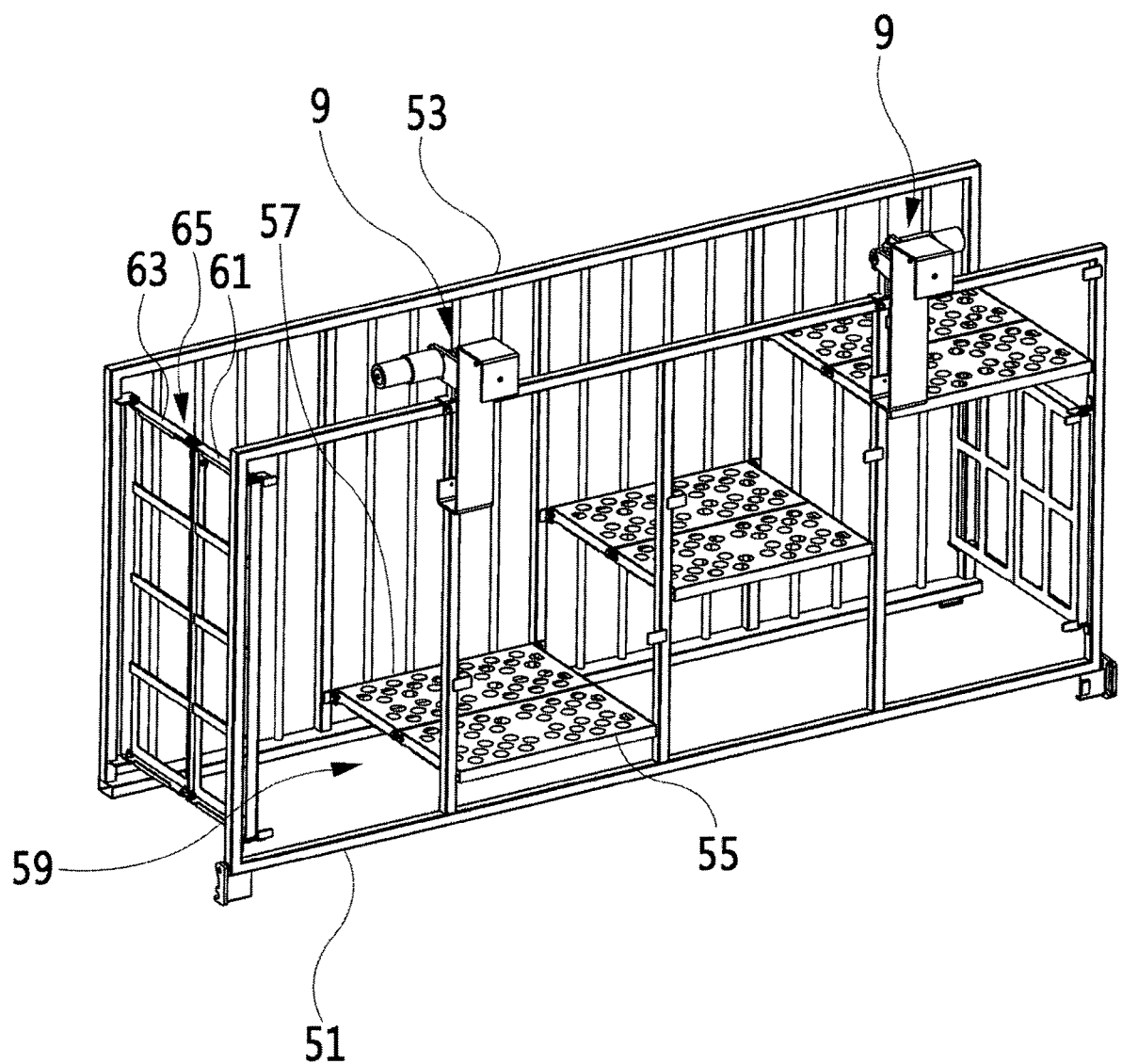
FIG. 5 is a view looking at a fall prevention and evacuation means from the rear-side of the fall prevention and evacuation means when the fall prevention and evacuation means is axially rotated in the direction of a lower floor through a hinge means.

The fall prevention and evacuation means (11), as shown in FIG. 5, comprises a hanger frame (51) which is a quadrangle frame shape, and of which a lower end is fixed to an outside of the high-rise building by the hinge means (9) and is axially rotated to an upper direction of the high-rise building or to a lower direction of the high-rise building; a guide frame (53) which is a quadrangle frame shape and has a window bar in a body thereof to prevent falling, and is overlapped with the hanger frame (51); two or more foot-stepping means (59) which are equipped with a first foothold (55) and a second foothold (57) which are connected hingedly, wherein both sides of the first foothold (55) are axially fixed to the hanger frame (51) and are axially rotated, and both sides of the second foothold (57) are axially fixed to the guide frame (53) and are axially rotated, in ordinary day without fire risk, in case that the hanger frame (51) stands in the upper direction of the high-rise building, the first foothold (55) and the second foothold (57) are superimposed and stand in a vertical direction, while in case that the hanger frame (51) is axially rotated in the lower direction of the high-rise building when the fire occurs, the superimposed first foothold (55) and second foothold (57) are laid in a horizontal direction and unfolded so as to enable footing; and a side folding plate (65) which has a first side plate (61) and a second side plate (63) which are installed to both side ends of the hanger frame (51) and the guide frame (53) and connected hingedly to therebetween, and an upper end and a lower end of the first side plate (61) are axially rotated in a state of being axially fixed to the hanger frame (51), an upper end and a lower end of the second side plate (63) are axially rotated in a state of being axially fixed to the guide frame (53), in ordinary day without fire risk, in case that the hanger frame (51) stands to an upper direction of the high-rise building, the superimposed first side plate (61) and second side plate (63) are inserted between the hanger frame (51) and the guide frame (53), when the fire occurs, in case that the hanger frame (51) is axially rotated in the lower direction of the high-rise building, the superimposed first side plate (61) and second side plate (63) are unfolded; and in ordinary day without fire risk, the foot-stepping means (59) and the side folding plate (65) are stacked (folded) between the hanger frame (51) and the guide frame (53) which stand in the upper direction of the high-rise building, to prevent the fall accident of the residents; and while when the fire occurs, the hanger frame (51) and the guide frame (53) are axially rotated in the lower direction of the high-rise building, and the superimposed first foothold (55) and second foothold (57) and the first side plate (61) and the second side plate (63) are unfolded such that the fire evacuee can step on the foot-stepping means (59) and move to a lower floor.

The two or more foot-stepping means (59) is installed with a height difference from each other, and when the fire occurs, the two or more foot-stepping means (59) is disposed in a step form.

Figure 6:
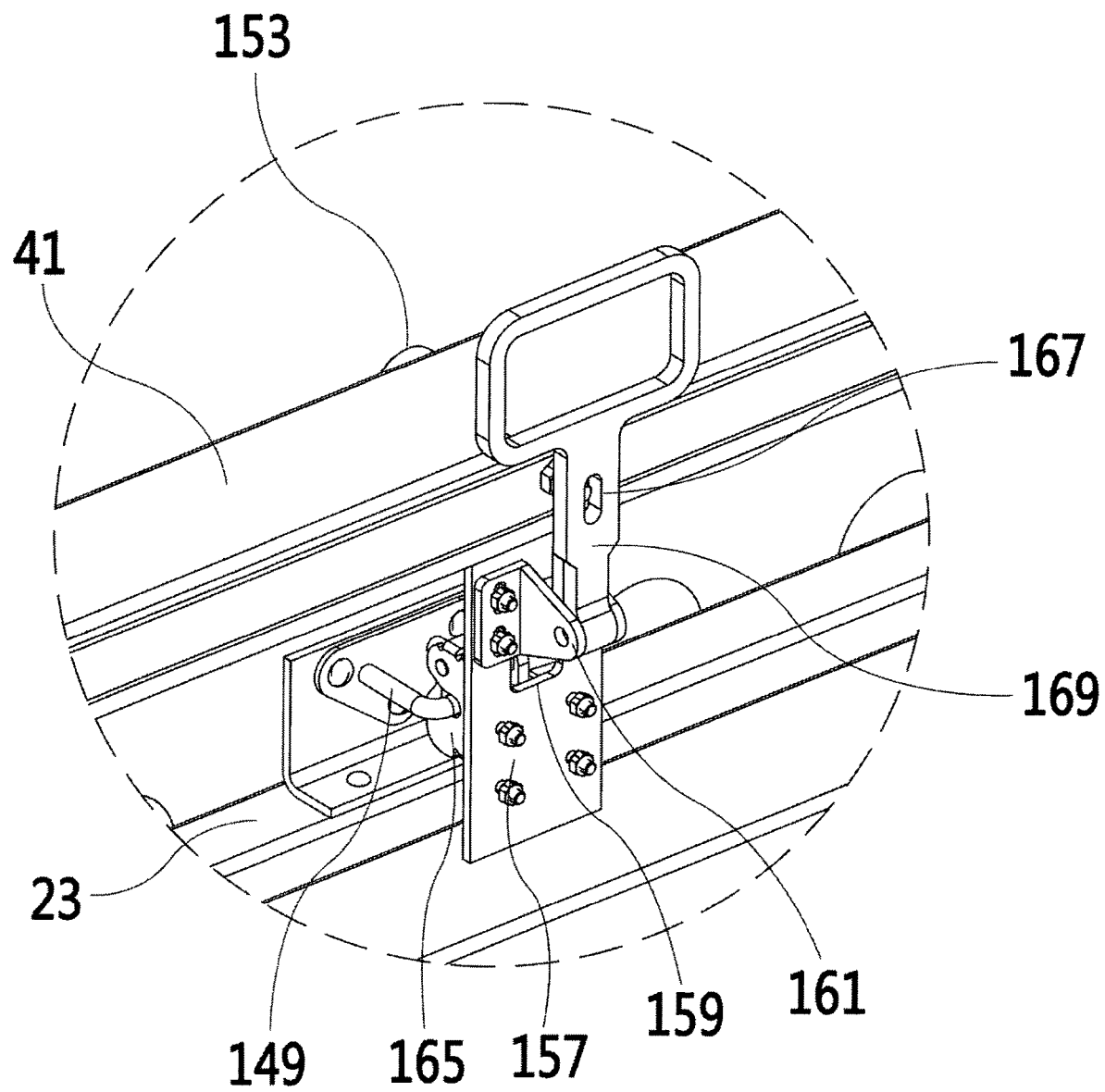
FIG. 6 to FIG. 8 illustrate an evacuation box locking means.
Figure 7:
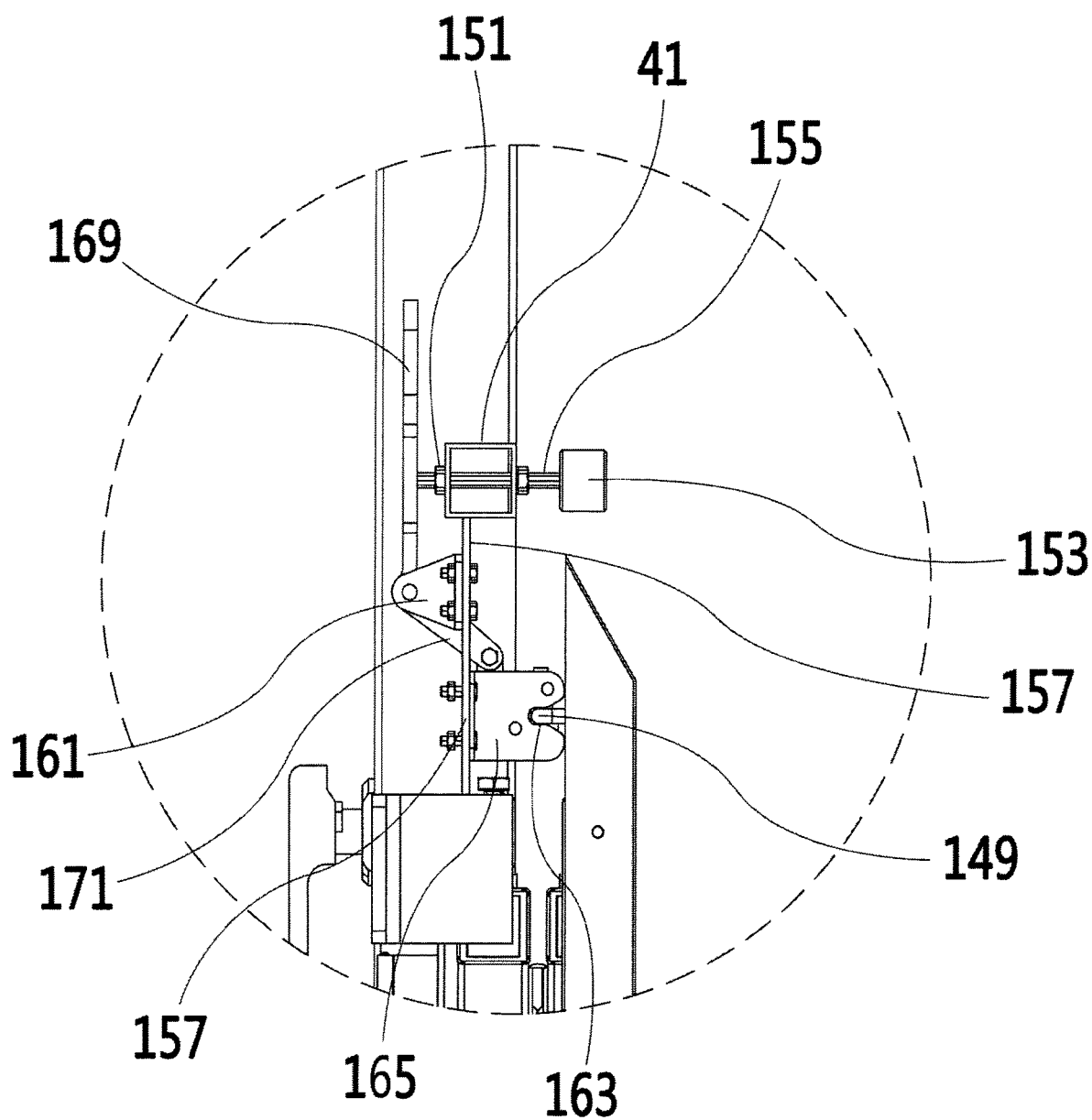
Figure 8:
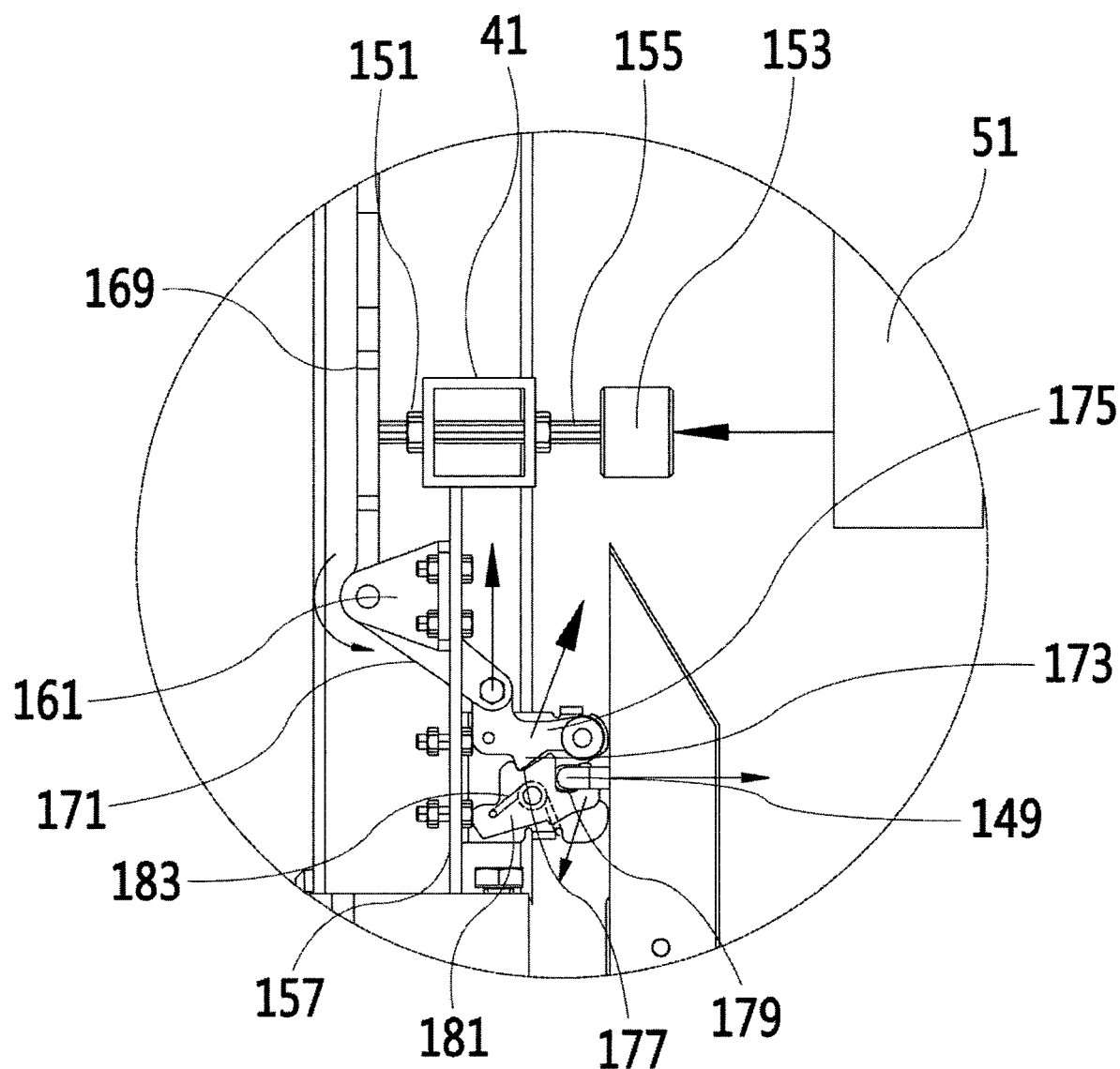

The evacuation box locking means (7), as shown in FIG. 6 to FIG. 8, comprises an U-shaped ring (149) which is equipped to an upper portion of the front moving frame (23) and is bent in a 'U' form; a push bar (155) which is slid to a direction of a front and a rear thereof in a state of being penetrated and fixed to the top horizontal bar (41), and has a ring-shaped step portion (151) in a body exposed to a rear direction of the top horizontal bar (41), and has a shock absorbing rubber (153) is mounted to a front end thereof, and the push bar (155) is collided with the fall prevention and evacuation means (11) of the upper floor and is slid to the rear direction of the top horizontal bar (41) when the fall prevention and evacuation means (11) of the upper floor is axially rotated to a direction of the lower floor; a vertical plate (157) which is mounted between the top horizontal bar (41) and the bottom horizontal bar (43) as a plate standing in a vertical direction; a movable arm passing hole (159) which penetrates the vertical plate (157); a pair of rear brackets (161) which protrudes side by side in a rear direction of the vertical plate (157) with the movable arm passing hole (159) interposed therebetween from a rear side of the vertical plate (157); a pair of front brackets (165) which protrudes side by side to a front direction of the vertical plate (157) with the movable arm passing hole (159) interposed therebetween from a front side of the vertical plate (157) and has 'ㄷ'-shaped groove (163) formed in a front end thereof; a lever (169) which is axially fixed and axially rotated to the pair of the rear brackets (161) as a lower portion thereof is inserted to the pair of the rear brackets (161) as a bar equipped with a handle to an upper end, and is penetrated by a push bar passing hole (167), in which a rear end of the push bar (155) is inserted, in a front side thereof facing the rear end of the push bar (155); an movable arm (171) which is inserted to the movable arm passing hole (159) as a linear bar, and of which one end is connected integrally to a lower end of the lever (169); a L-shaped locking piece (175) which is inserted to the pair of the front brackets (165) as a plate of a L-shaped form, and of which an upper portion of a rear end is axially fixed to the other side of the movable arm (171), and of which a front end is axially fixed to the pair of the front brackets (165), and has a triangle locking protrusion (173) of a right angle triangle form protruding in a lower side thereof; a U-shaped ring catch piece (181) which is axially rotated in a state of being axially fixed to the pair of the front brackets (165), and is disposed to a lower portion of the L-shaped locking piece (175), and a triangle locking groove (177), which is interlocked with the triangle locking protrusion (173), formed in an upper side thereof, and has a first locking hook (179), in which an U-shaped ring (149) is hung, formed in a front direction of an upper portion thereof; and a torsion spring (183) which makes the U-shaped ring catch piece (181) rotate elastically in clockwise direction and makes the U-shaped locking ring exit from the first locking hook (179) when the triangle locking protrusion (173) exits from the triangle locking groove (177); and in case that the fall prevention and evacuation means (11) installed in the upper floor is axially rotated by 180 degrees to the direction of the lower floor and bumped to a front end of the push bar (155) when the fire occurs, a rear end of the push bar (155) is inserted to the push bar passing hole (167) penetrated by the lever (169) as the push bar (155) is pushed to a rear direction of the top horizontal bar (41), and the ring-shaped step portion (151) mounted to the push bar (155) pushes the lever (169) in counterclockwise direction.

Meanwhile, in case that the lever (169) is rotated in counterclockwise direction, the other end of the movable arm (171) is rotated in counterclockwise direction according to the lever (169), and the L-shaped locking piece (175) is axially rotated to clockwise direction by being guided by the movable arm (171).

Also, the triangle locking protrusion (173) which is integrally connected to the L-shaped locking piece (175) exits from the triangle locking groove (177), and the first locking hook (179) is rotated in clockwise direction by the torsion spring (183) according to the U-shaped ring catch piece (181), and the U-shaped ring (149) exits from the first locking hook (179).

Also in the present invention, a fall prevention and evacuation means holder (141) is additionally mounted, which fixes the hanger frame (51) equipped to the fall prevention and evacuation means (11) and the fixed frame (1) installed in the lower floor, and minimizes shaking of the fall prevention and evacuation means (11) that is structurally changed to the emergency stairway for fire evacuation when the fall prevention and evacuation means (11) is axially rotated to the direction of the lower floor.

As shown in FIG. 1, the fall prevention and evacuation means holder (141) is three-dimensional structure form and is mounted to the top horizontal bar (41) and comprises a L-shaped latch fitting portion (145) of which a long hole (143) is mounted to a front side; a L-shaped latch (147) which protrudes in a 'L'-form to an upper portion of a front side of the hanger frame (51).

When the fall prevention and evacuation means (11) installed to the current floor is axially rotated to the lower floor direction by 180 degrees, the L-shaped latch (147) mounted to the hanger frame (51) is inserted to the long hole (143) of the L-shaped latch fitting portion (145) installed in the lower floor, thereby the fall prevention and evacuation means holder (141) minimizes shaking of the fall prevention and evacuation means (11) that is structurally changed to the emergency stairway for fire evacuation.

Figure 9:
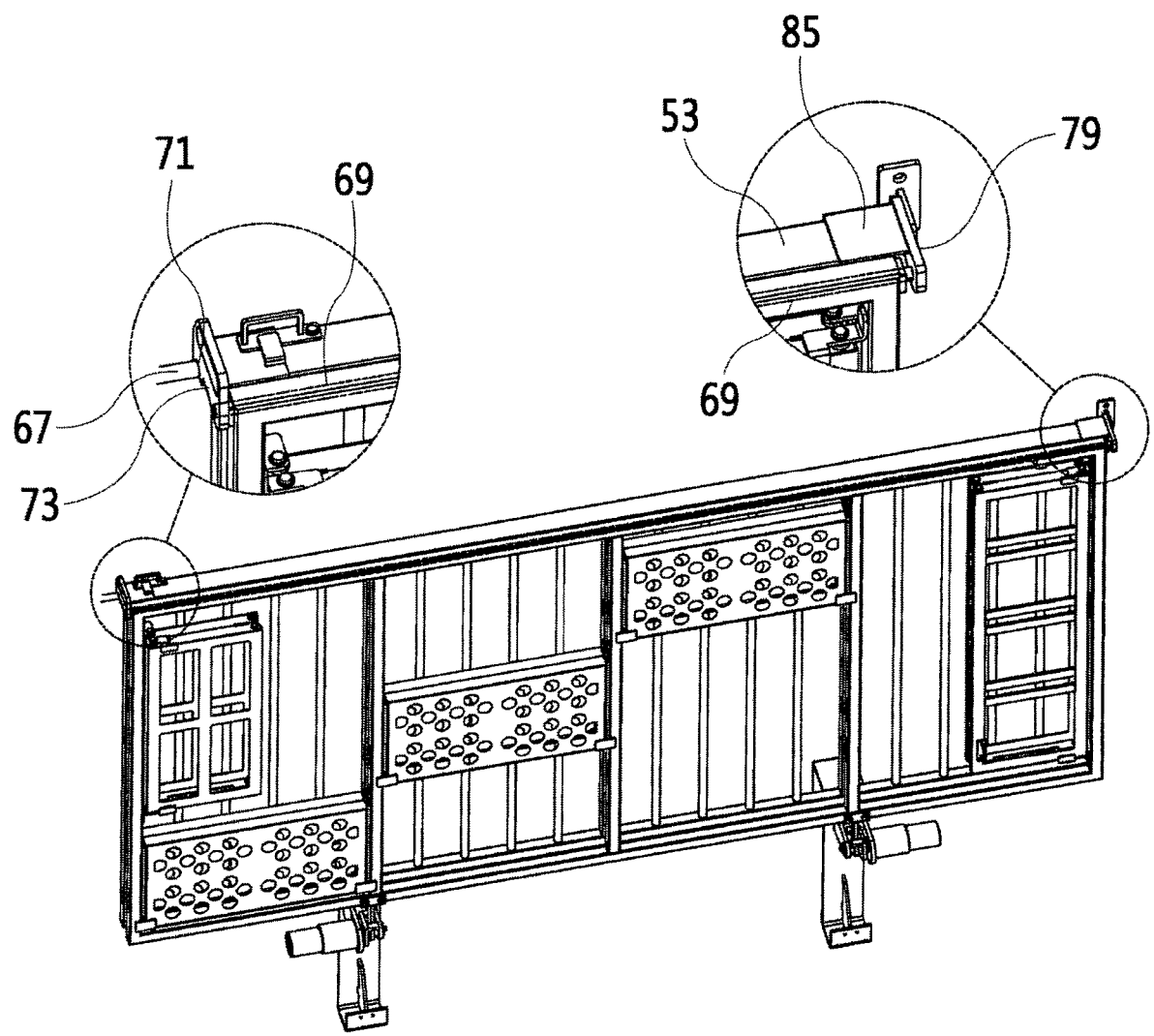
FIG. 9 is a view to explain a locking means.
Figure 10:
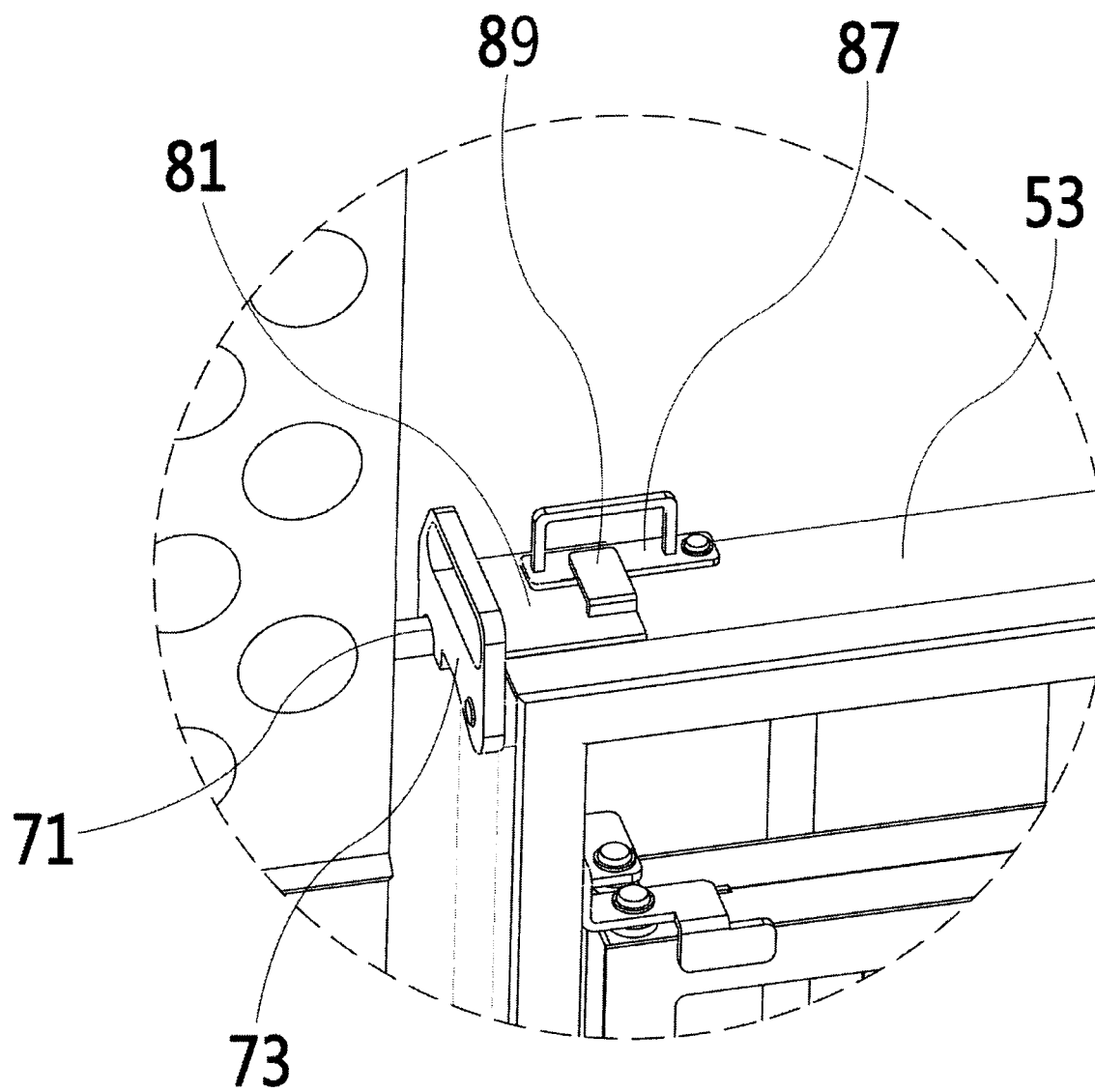
FIG. 10 is a view to explain a relation of combination of a lock handle and a lock handle holder.
Figure 11:
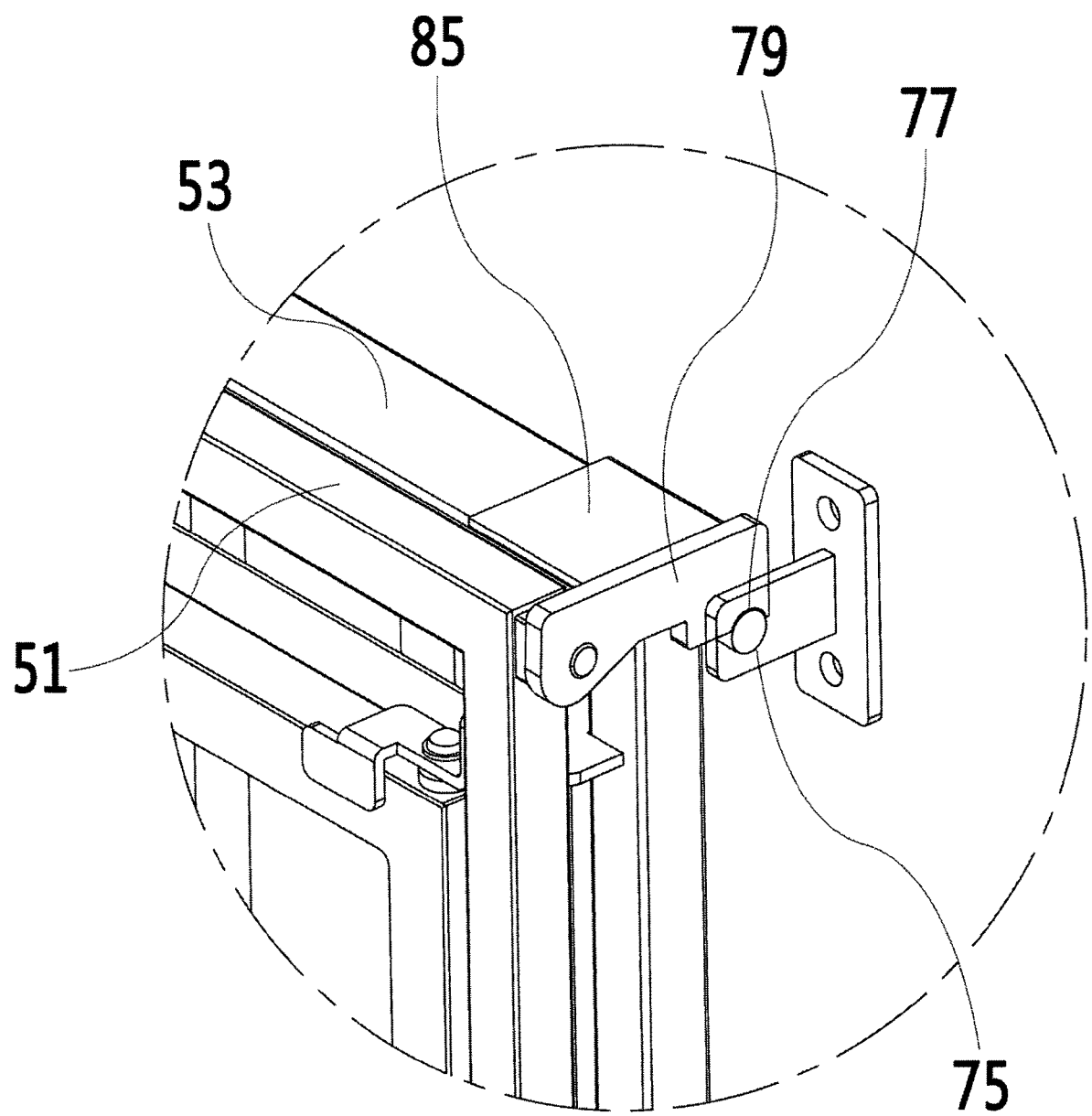
FIG. 11 is a view to explain the other side fixing piece.
Figure 12:
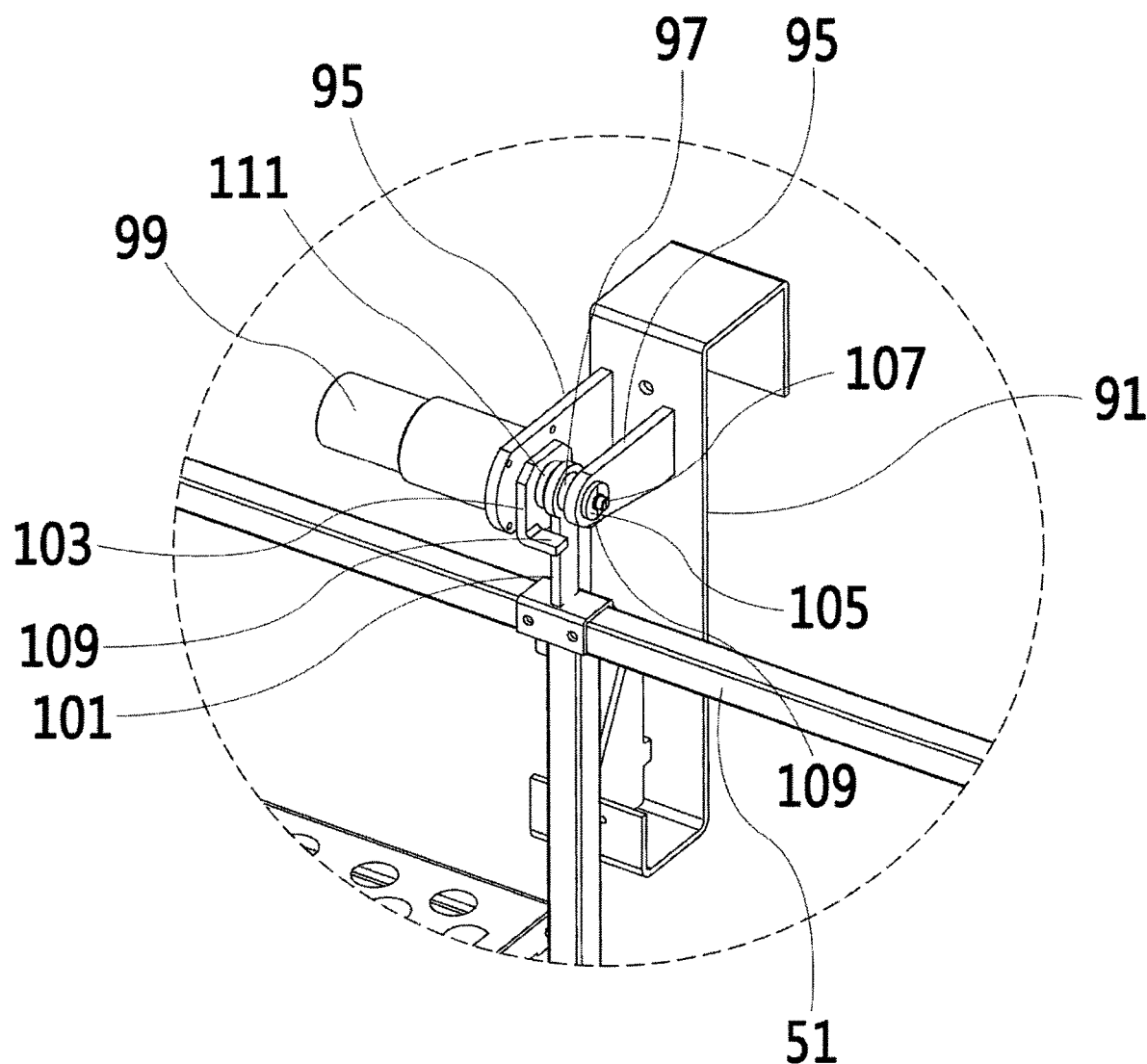
FIG. 12 illustrates a hinge means.

As shown in FIGS. 9 to 11, the locking means (13) comprises one side fixing bar (67) which protrudes from a side of the fixed frame (1) facing one side of an upper portion of the guide frame (53) to the direction of the guide frame (53), a locking arm (69) which is a bar shape and is axially rotated in a state of being penetrated and fixed on an upper portion of the hanger frame (51), and has one end and the other end thereof protruding outwardly from a left side and a right side of the hanger frame (51) respectively, one side fixing piece (73) which is fixed to one end of the locking arm (69) and has a second locking hook (71) formed on a bottom side thereof facing the one side fixing bar (67) and in which the one side fixing bar (67) is fitted, wherein when it is axially rotated in any one direction with the locking arm (69), the one side fixing bar (67) is caught by the second locking hook (71) and fixed, while when it is axially rotated in the other direction with the locking arm (69), the one side fixing bar (67) caught by the second locking hook (71) exits from the second locking hook (71), the other side fixing bar (75) which protrudes to a direction of the guide frame (53) from the bracket protruding to the front of the building from the outer wall of the building, and the other side fixing piece (79) which is fixed to the other end of the locking arm (69)

and has a third locking hook (77) formed on a bottom side thereof facing the other side fixing bar (75) and in which the other side fixing bar (75) is fitted, wherein when it is axially rotated in any one direction with the locking arm (69), the other side fixing bar (75) is caught by the third locking hook (77) and fixed, while when it is axially rotated in the other direction with the locking arm (69), the other side fixing bar (75) caught by the third locking hook (77) exits from the third locking hook (77), such that when the one side fixing piece (73) is axially rotated in the other direction, the locking arm (69) and the other side fixing piece (79) are axially rotated along the one side fixing piece (73) thereby a locking is released and the hanger frame (51) and the guide frame (53) are axially rotated in the lower direction of the high-rise building.

The upper portion of the one side fixing piece (73) is equipped with a handle so as to facilitate rotating the one side fixing piece (73) in a counterclockwise or a clockwise direction.

As shown in FIG. 10, in one side of the one side fixing piece (73) facing the guide frame (53), one side '┐'-shaped iron piece (81) is provided, which takes a '┐' shape in a longitudinal section thereof and extends from the one side of the one side fixing piece (73) to the direction of the guide frame (53) and has inner side thereof coming in contact with a rear side and with a top side of the guide frame (53), and as shown in FIG. 11, in the one side of the other side fixing piece (79) facing the guide frame (53), the other side '┐'-shaped iron piece (85) is provided, which takes a '┐' shape in a longitudinal section thereof and extends from the one side of the other side fixing piece (79) to the direction of the guide frame (53) and has inner side thereof coming in contact with the rear side and with the top side of the guide frame (53).

As shown in FIG. 10, in the top side of the guide frame (53), a lock handle (87) is mounted, which is a plate shape and is disposed in parallel with the guide frame (53), and is axially rotated in a state of being axially fixed to the guide frame (53).

Also, in a top side of the one side '┐'-shaped iron piece (81), a lock handle holder (89) is additionally mounted, which is a 'Γ'-shape and prevents the one side fixing piece (73) from being axially rotated by caught by the lock handle (87) when the lock handle (87) is axially rotated in an outward direction of the high-rise building.

As shown in FIGS. 12 to 15, the hinge means (9) comprises a wall fixing bracket (91) which is fixed to an outer wall of the building disposed under the hanger frame (51), a pair of shaft fixing brackets (95) which protrudes, side by side with a predetermined width interval therebetween, from a front side of the wall fixing bracket (91) to a front of the building, and is penetrated with a shaft fixing hole (93) in a side thereof, a reducer (99) which includes a shaft (97) fitted in the shaft fixing hole (93) and reduces a rotation speed of the shaft (97) in a state of being equipped to an outer side of the shaft fixing bracket (95), a hanger frame hold arm (101) which is a bar shape and has a lower end thereof axially fixed to the shaft (97) and axially rotated and an upper end thereof fixedly coupled to a lower end of the hanger frame (51), a rotator bracket (103) which is mounted between the pair of shaft fixing brackets (95) and, in a state of being integrally coupled with the shaft (97), is rotated along the shaft (97) and axially rotated with the shaft (97) along the hanger frame hold arm (101), an end cap (105) which is a circular ring shape and comes in contact with the outer side of the shaft fixing bracket (95), and a fixing bolt (107) which penetrates the end cap (105) and then is bolt-coupled to a front end of the shaft (97), wherein when the hanger frame hold arm (101) is axially rotated along the hanger frame (51) in the lower direction of the high-rise building, the rotator bracket (103) is axially rotated along the hanger frame hold arm (101) and the shaft (97) integrally coupled with the rotator bracket (103) is rotated along the rotator bracket (103) and the reducer (99) reduces the rotation speed of the shaft (97) and consequently reduces the rotation speed of the hanger frame (51).

Also, the hinge means (9) further comprises an anti-interference ring (111), which is a circular ring shape and is penetrated by the shaft (97) between any one of the shaft fixing bracket (95) and the rotator bracket (103) adjacent to each other, between the rotator bracket (103) and the hanger frame hold arm (101) adjacent to each other, and between the hanger frame hold arm (101) and the other shaft fixing bracket (95) adjacent to each other so as to prevent a collision between the shaft fixing bracket (95), the rotator bracket (103), and the hanger frame hold arm (101).

Figure 13:
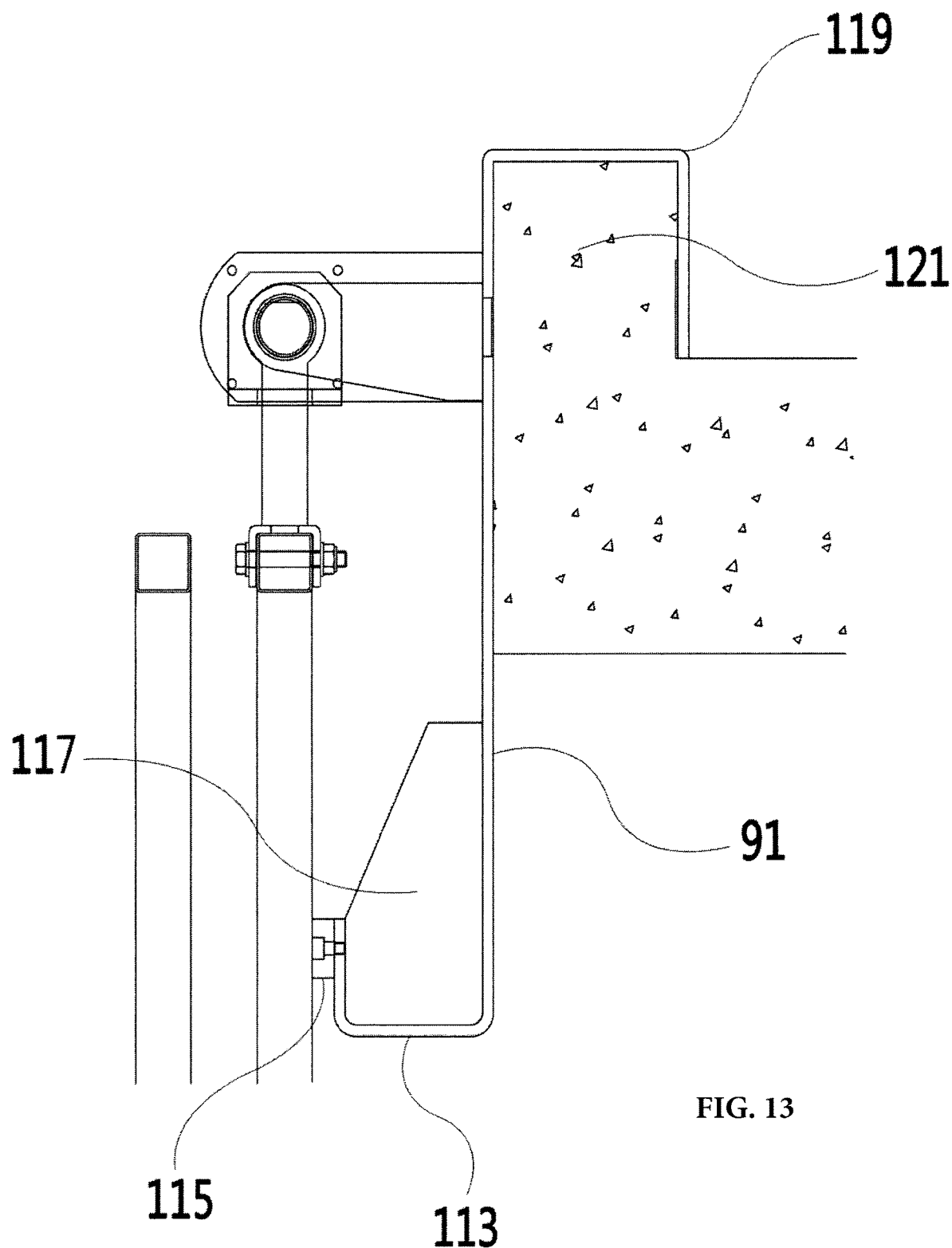
FIG. 13 is a view from the side of a hinge means.
Figure 14:
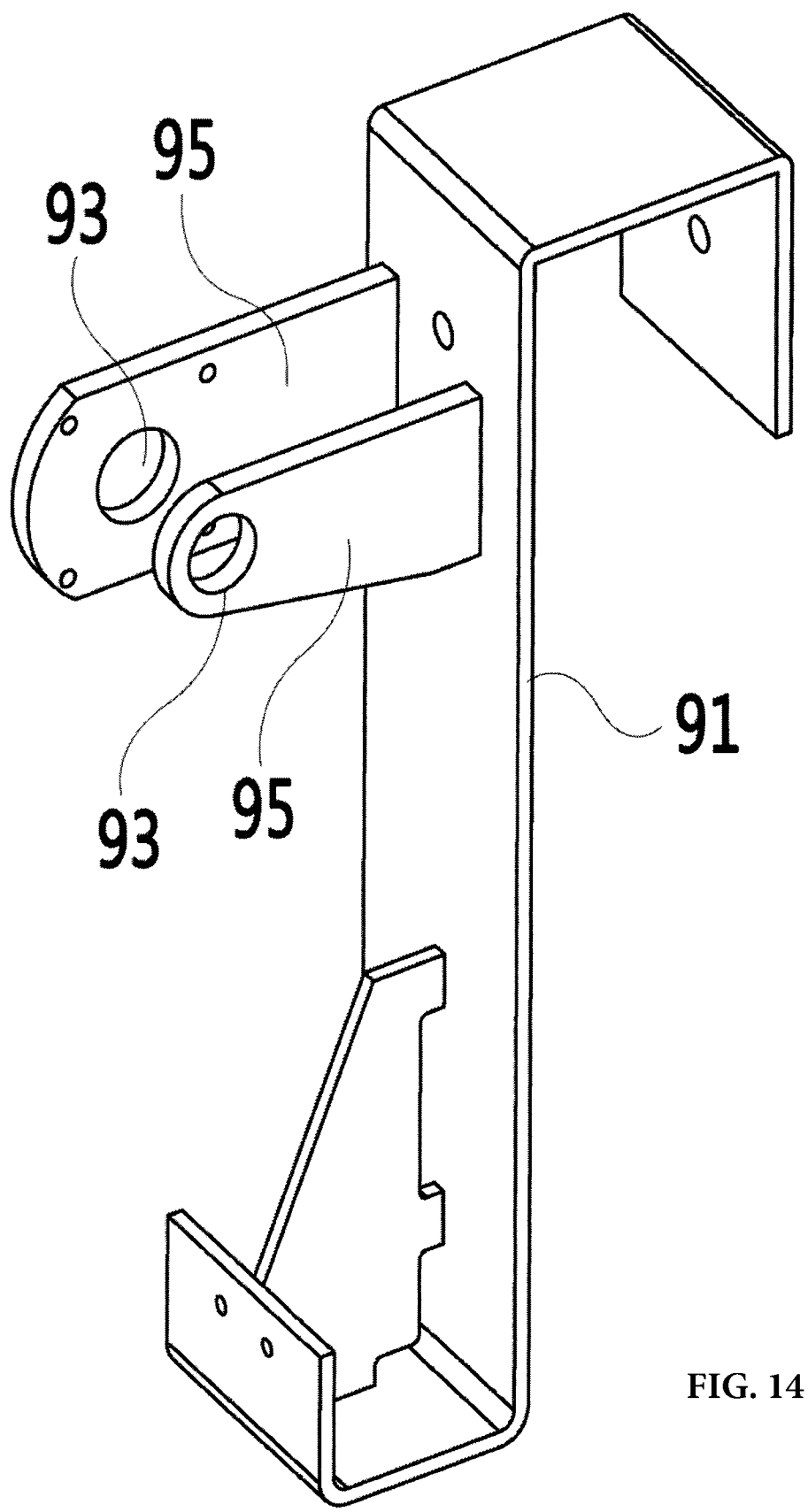
FIG. 14 illustrates a shaft fixed hole which is formed in a shaft fixed bracket.

As shown in FIG. 13, a shock absorbing bracket (113) which takes a '∟' shape is additionally mounted in a lower end of the wall fixing bracket (91), and an impact shock absorbing member (115) is additionally mounted in a front of the shock absorbing bracket (113) for cushioning the impact when colliding with the hanger frame (51).

Further, a reinforcing piece (117) is mounted between the shock absorbing bracket (113) and the wall fixing bracket (91) to secure the coupling between the shock absorbing bracket (113) and the wall fixing bracket (91).

Further, a '┐'-shaped bracket (119) which takes a '┐' shape is additionally mounted in an upper end of the wall fixing bracket (91), and the '⌐'-shaped bracket (119) is fitted to a concrete step portion (121) protruding in a quadrangle shape from a bottom end of a balcony or a veranda.

Figure 15:
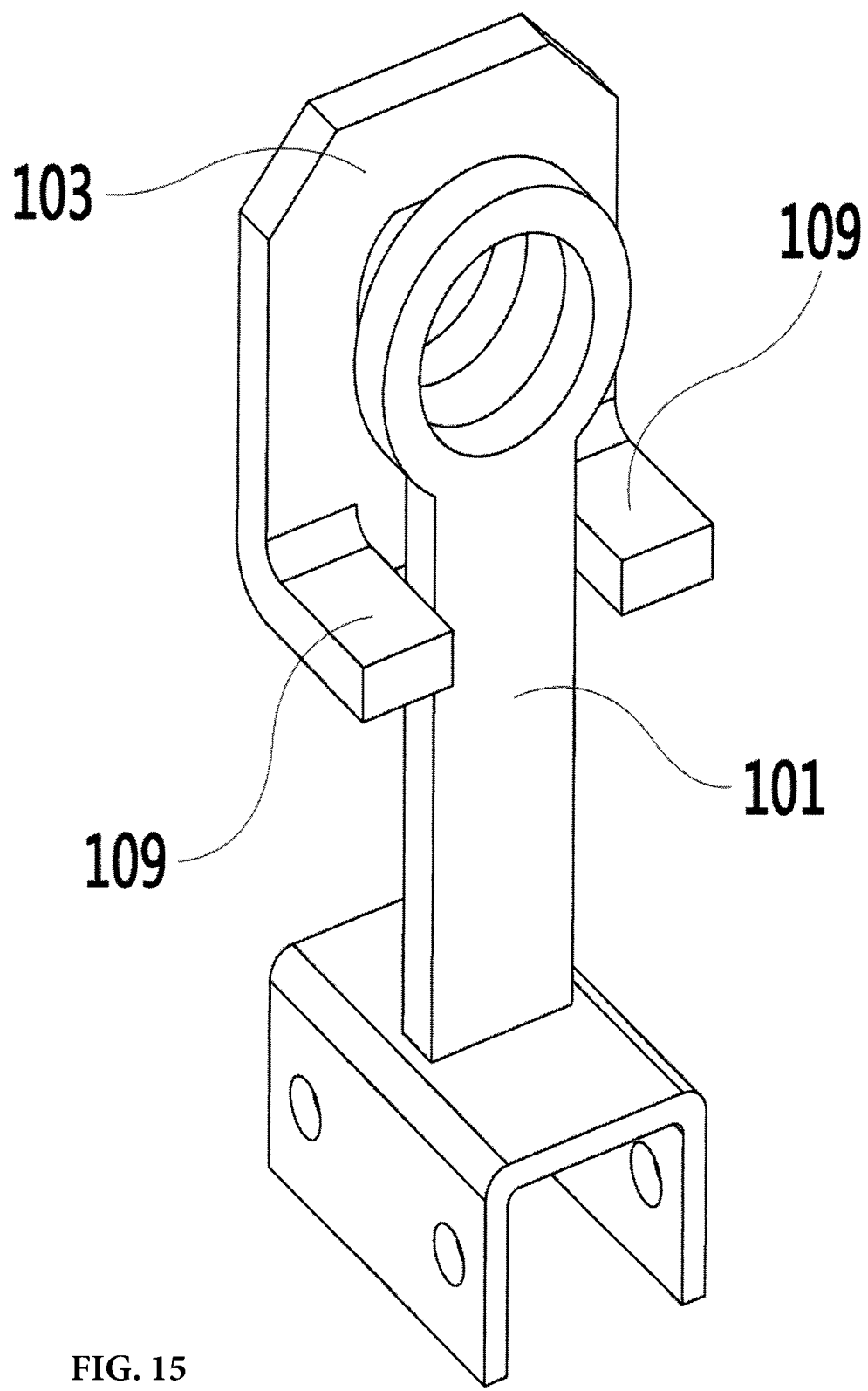
FIG. 15 illustrates a hold arm engaging protrusion prepared to a rotator bracket.

As shown in FIG. 15, in one side of the rotator bracket (103), a pair of hold arm engaging protrusions (109) is provided which protrudes side by side with the hanger frame hold arm (101) interposed therebetween, and the hanger frame hold arm (101) being axially rotated pushes the hold arm engaging protrusion (109) and the hold arm engaging protrusion (109) axially rotates the rotator bracket (103) and the shaft (97) which are integrally coupled.

Figure 16:
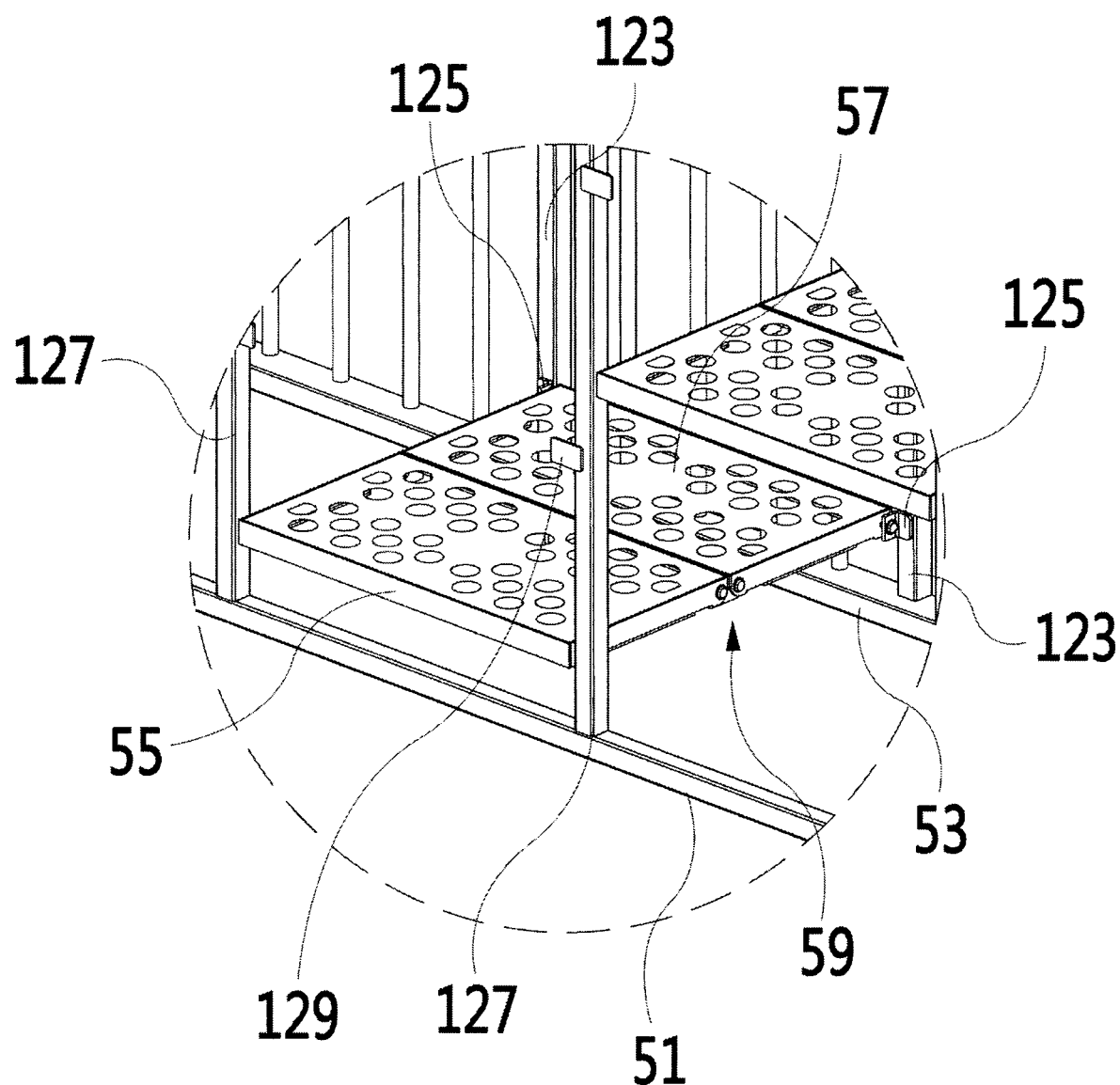
FIG. 16 is a view to explain a 'ㄱ'-shaped hinge bracket and a foot-stepping means stopping plate.

As shown in FIG. 16, the guide frame (53) is provided with two or more vertical direction guide angle frames (123) standing in the vertical direction and in between of which the foot-stepping means (59) is fitted, and, as shown in FIG. 16, a '┐'-shaped hinge bracket (125) which takes a '┐' shape is mounted on the vertical direction guide angle frames (123) which is in contact with the second foothold (57), and both sides of the second foothold (57) are axially fixed to the '┐'-shaped hinge bracket (125).

Further, the hanger frame (51) is provided with two or more vertical direction hanger angle frames (127) standing in the vertical direction and in between of which the foot-stepping means (59) is fitted, and both sides of the first foothold (55) are axially fixed to the vertical direction hanger angle frames (127).

Further, a foot-stepping means stopping plate (129) which is a plate shape is mounted on the vertical direction hanger angle frames (127) to support the first foothold (55) so that the first foothold (55) and the second foothold (57), which are superimposed at ordinary times when a fire does not occur, do not tilt in front of the hanger frame (51).

Figure 17:
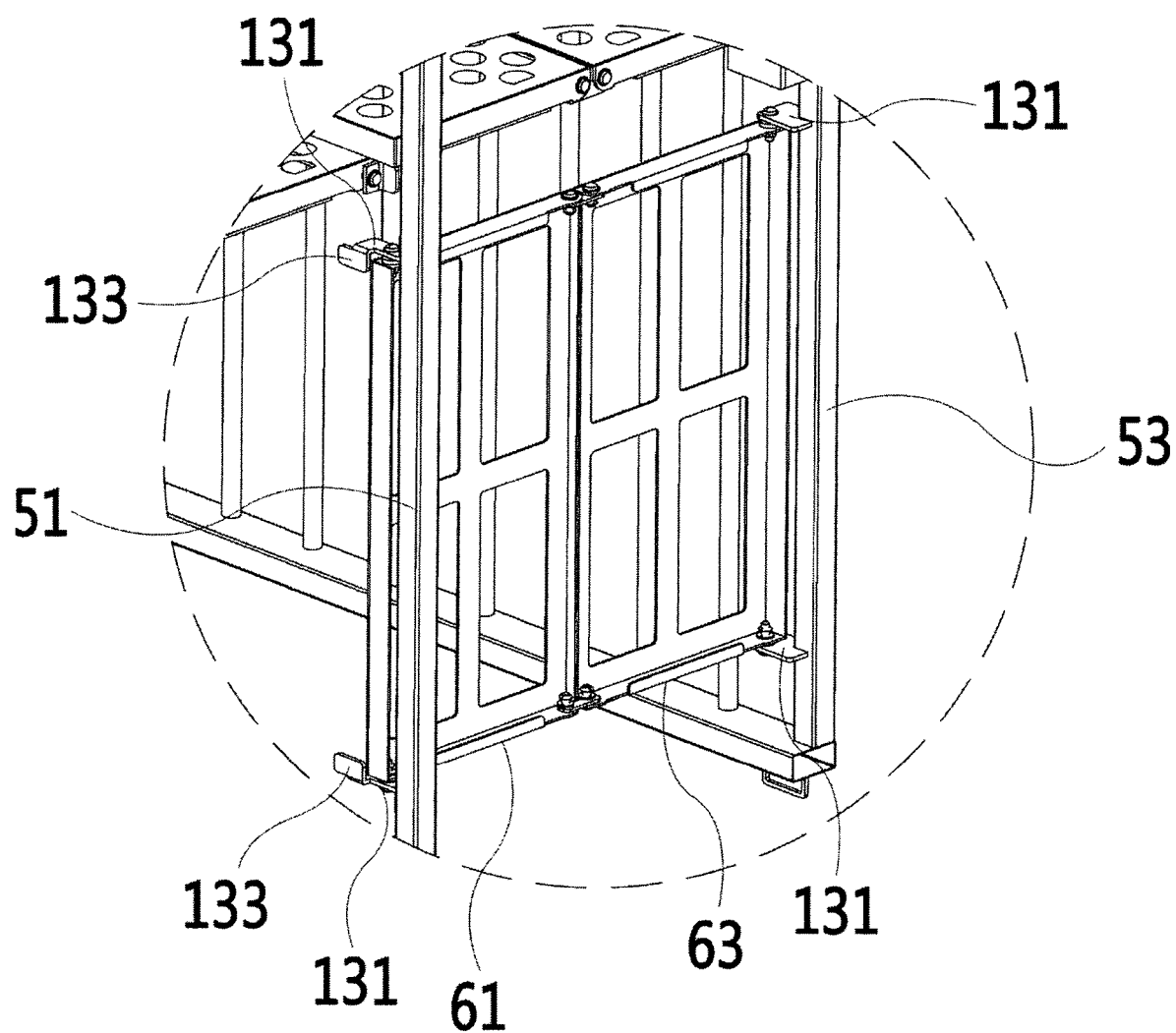
FIG. 17. is a view to explain a side folding plate hinge bracket and a side folding plate stopper.

As shown in FIG. 17, left and right ends of the hanger frame (51) and left and right ends of the guide frame (53) facing the upper end and the lower end of the side folding plate (65) are provided a side folding plate hinge bracket (131) protruding in an inward direction of the hanger frame (51) or the guide frame (53) in a state of being laid down in the horizontal direction, and the upper end and the lower end of the first side plate (61) and the upper end and the lower end of the second side plate (63) are axially fixed to the side folding plate hinge bracket (131).

In addition, as shown in FIG. 17, on a side edge of the side folding plate hinge bracket (131) mounted on the hanger frame (51), a side folding plate stopper (133) is mounted, which stands in the vertical direction having a 90 degree-internal angle with the side folding plate hinge bracket (131), such that it prevents the side folding plate (65) from tilting to the front of the hanger frame (51) at ordinary times when a fire does not occur.

Figure 18:
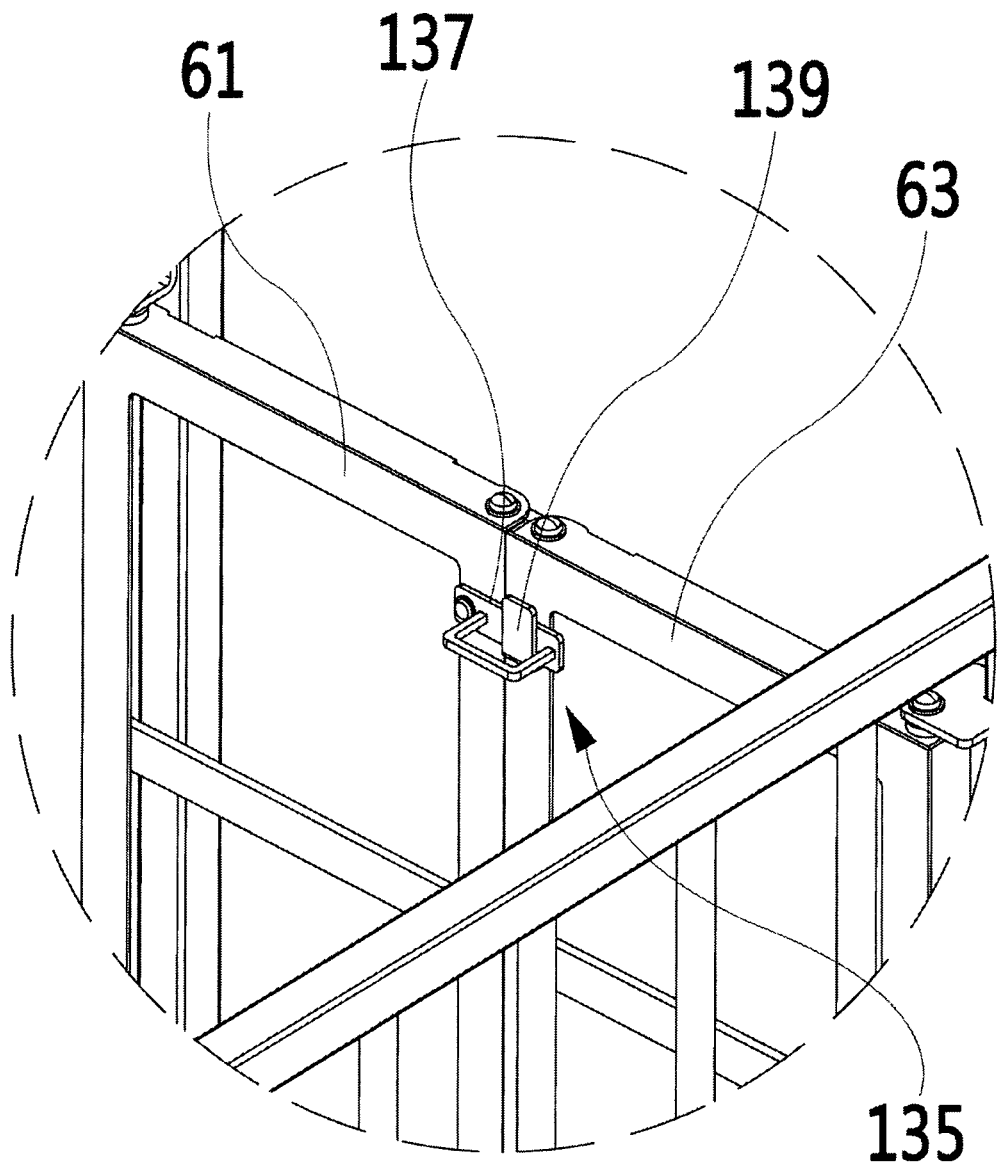
FIG. 18. illustrates a folding preventing means equipped to a side folding plate.

As shown in FIG. 18, a folding preventing means (135) is mounted on any one of the side folding plate (65) to prevent the first side plate (61) and the second side plate (63), which are unfolded in a form of a line, from folding when the fire occurs The folding preventing means (135) may comprise an anti-folding lock handle (137) which is disposed in parallel with the first side plate (61) and axially rotated in a state of being axially fixed to the first side plate (61), and an anti-folding L-shaped latch (139) which is a 'L' shape and is mounted on the second side plate (63), and holds and fixes the anti-folding lock handle (137) rotated in a clockwise direction so as to prevent the first side plate (61) and the second side plate (63), which are unfolded in a form of a line, from folding.

A foldable balcony balustrade-combined fire/disaster evacuation facility according to the present invention comprising these structures enables a person who is isolated in a high-rise building to descend safely to the ground through a veranda or a balcony when a fire occurs in the high-rise building and a main entrance door is shut down.

Also, the present invention may prevent thefts or body threats by a sexual harasser because an upper floor resident cannot enter inside of a lower floor without permission of a lower floor resident when the present invention is structurally changed to an emergency stairway for fire/disaster evacuation in ordinary day without fire risk.

What is claimed is:

1. A foldable balcony balustrade-combined fire/disaster evacuation facility comprising:
    a fixed frame which is a quadrangle frame shape and is fixedly installed on an outer wall of a veranda or a balcony of a high-rise building;
    a foldable evacuation box which is overlapped with the fixed frame and prevents a falling accident of residents who live in the high-rise building in ordinary day without fire risk, and is unfolded in a rectangular parallelepiped form having an open top side and has an evacuation door on a side thereof when a fire occurs;
    a fall prevention and evacuation means which is installed to a left side or right side of the fixed frame and a lower end thereof is fixed to an outside of the high-rise building by a hinge means, in ordinary day without fire risk, it is used as a safety balustrade to prevent falling as a rear side thereof comes in contact with the outside of the high-rise building, and when the fire occurs it is axially rotated by 180 degrees in a lower direction of the high-rise building by the hinge means, thereby is structurally changed to an emergency stairway for fire evacuation;
    an evacuation box locking means which holds and fixes the foldable evacuation box to the fixed frame for the foldable evacuation box not to be unfolded to a rectangular parallelepiped form in ordinary day without fire risk, but which releases the foldable evacuation box being held and allows the foldable evacuation box to be unfolded in a rectangular parallelepiped form in case that a lever is operated or collides with the fall prevention and evacuation means that is axially rotated from an upper floor to a lower floor when the fire occurs; and
    a locking means which holds and fixes the fall prevention and evacuation means to the fixed frame for the fall prevention and evacuation means not to be axially rotated by 180 degrees in a lower direction of the high-rise building by the hinge means in ordinary day without fire risk; and
    an entry preventing door which is installed to the fixed frame and prevents an evacuee descending from an upper floor from entering inside of the veranda or the balcony through the fixed frame from the foldable evacuation box;
    wherein, in ordinary day without fire risk, the foldable evacuation box is overlapped with the fixed frame, and the fall prevention and evacuation means stands to an outer wall of the veranda or the balcony to prevent a falling accident of residents;
    wherein, when the fire occurs, in case that the lever installed to the evacuation box locking means is operated or the fall prevention and evacuation means installed in the upper floor is axially rotated to a direction of a lower floor, the foldable evacuation box is unfolded in a rectangular parallelepiped form;
    wherein, in case that the locking means is released, the fall prevention and evacuation means is axially rotated by 180 degrees to the direction of the lower floor and is structurally changed to the emergency stairway for fire evacuation, and residents who live in a current floor open the entry preventing door and enter the foldable evacuation box installed in the current floor and repeat a process of moving to the foldable evacuation box of the lower floor through the fall prevention and evacuation means which is installed in the current floor and is structurally changed to the emergency stairway for fire evacuation, thereby descend to the ground;
    wherein the foldable evacuation box comprises:
    a front moving frame which is a frame of rectangular form, wherein a fall preventing plate is installed to a front side thereof;
    an evacuation door which is hingedly connected to one side of the front moving frame facing against the fall prevention and evacuation means;
    a foldable foothold of which a front of both side is hingedly connected to a lower portion of the front moving frame, and of which a rear of both side is hingedly connected to a lower portion of the fixed frame, wherein it is folded and stands in a vertical direction between the front moving frame and the fixed frame which are facing each other when a locking of the evacuation box locking means is not released, but it is unfolded in a horizontal direction when the locking of the evacuation box locking means is released and the front moving frame moves to a front direction; and
    a foldable side wall of which an upper and a lower portion of a first end is hingedly connected to the other side of the front moving frame to which the evacuation door is not installed, and of which an upper and a lower portion of a second end is hingedly connected to the other side of the fixed frame which is faced to the other side of the front moving frame in a front and a rear direction, wherein it is folded between the front moving frame and the fixed frame which are facing each other when the locking of the evacuation box locking means is not released, but it is unfolded to a linear form in a state of standing in a vertical direction when the locking of the evacuation box locking means is released and the front moving frame moves to a front direction;

wherein, in case that the foldable evacuation box is installed to a left side of an upper floor of the high-rise building and the fall prevention and evacuation means is installed to a right side of the upper floor, the foldable evacuation box is installed to a right side of a lower floor of the high-rise building and the fall prevention and evacuation means is installed to a left side of the lower floor, while in case that the foldable evacuation box is installed to the right side of the upper floor and the fall prevention and evacuation means is installed to the left side of the upper floor, the foldable evacuation box is installed to the left side of the lower floor and the fall prevention and evacuation means is installed to the right side of the lower floor.

2. The foldable balcony balustrade-combined fire/disaster evacuation facility according to claim 1, wherein, a top horizontal bar and a bottom horizontal bar which have a predetermined height interval therebetween and are laid in a horizontal direction are positioned inside of and connected to the fixed frame;

wherein, the entry preventing door is installed to the fixed frame which is disposed to a lower portion of the bottom horizontal bar;

wherein, the evacuation box locking means comprises:

a U-shaped ring which is equipped to an upper portion of the front moving frame and is bent in a 'U' form;

a push bar capable of sliding in both a forward and rearward direction and in a state of being penetrated and fixed to the top horizontal bar, and has a ring-shaped step portion in a body exposed to a rear direction of the top horizontal bar, and has a shock absorbing rubber mounted to a front end thereof, wherein the push bar is collided with the fall prevention and evacuation means of the upper floor and is slid to the rear direction of the top horizontal bar when the fall prevention and evacuation means of the upper floor is axially rotated to a direction of the lower floor;

a vertical plate which is mounted between the top horizontal bar and the bottom horizontal bar as a plate standing in a vertical direction;

a movable arm passing hole which penetrates the vertical plate;

a pair of rear brackets which protrudes side by side in a rear direction of the vertical plate with the movable arm passing hole interposed therebetween from a rear side of the vertical plate;

a pair of front brackets which protrudes side by side to a front direction of the vertical plate with the movable arm passing hole interposed therebetween from a front side of the vertical plate and has '⊏'-shaped groove formed in a front end thereof;

a lever which is axially fixed and axially rotated to the pair of the rear brackets as a lower portion thereof is inserted to the pair of the rear brackets as a bar equipped with a handle to an upper end, and is penetrated by a push bar passing hole, in which a rear end of the push bar is inserted, in a front side thereof facing the rear end of the push bar;

a movable arm which is inserted to the movable arm passing hole as a linear bar, and of which one end is connected integrally to a lower end of the lever;

a L-shaped locking piece which is inserted to the pair of the front brackets as a plate of a L-shaped form, and of which an upper portion of a rear end is axially fixed to the other side of the movable arm, and of which a front end is axially fixed to the pair of the front brackets, and has a triangle locking protrusion of a right angle triangle form protruding in a lower side thereof;

a U-shaped ring catch piece which is axially rotated in a state of being axially fixed to the pair of the front brackets, and is disposed to a lower portion of the L-shaped locking piece, and has a triangle locking groove, which is interlocked with the triangle locking protrusion, formed in an upper side thereof, and has a first locking hook, in which an U-shaped ring is hung, formed in a front direction of an upper portion thereof; and a torsion spring which makes the U-shaped ring catch piece rotate elastically in clockwise direction and makes the U-shaped locking ring exit from the first locking hook when the triangle locking protrusion exits from the triangle locking groove;

wherein, in case that the fall prevention and evacuation means installed in the upper floor is axially rotated by 180 degrees to the direction of the lower floor and bumped to a front end of the push bar when the fire occurs, a rear end of the push bar is inserted to the push bar passing hole penetrated by the lever as the push bar is pushed to a rear direction of the top horizontal bar, and the ring-shaped step portion mounted to the push bar pushes the lever in counterclockwise direction;

wherein, in case that the lever is rotated in counterclockwise direction, the other end of the movable arm is rotated in counterclockwise direction according to the lever, and the L-shaped locking piece is axially rotated to clockwise direction by being guided by the movable arm;

wherein, the triangle locking protrusion which is integrally connected to the L-shaped locking piece exits from the triangle locking groove;

wherein, the first locking hook is rotated in clockwise direction by the torsion spring according to the U-shaped ring catch piece, and the U-shaped ring exits from the first locking hook.

3. The foldable balcony balustrade-combined fire/disaster evacuation facility according to claim 1, wherein the fall prevention and evacuation means comprises:

a hanger frame which is a quadrangle frame shape, and of which a lower end is fixed to an outside of the high-rise building by the hinge means and is axially rotated to an upper direction of the high-rise building or to a lower direction of the high-rise building;

a guide frame which is a quadrangle frame shape and has a window bar in a body thereof to prevent falling, and is overlapped with the hanger frame;

two or more foot-stepping means which are equipped with a first foothold and a second foothold which are connected hingedly, wherein both sides of the first foothold are axially fixed to the hanger frame and are axially rotated, and both sides of the second foothold are axially fixed to the guide frame and are axially rotated, in ordinary day without fire risk, in case that the hanger frame extends towards the upper direction of the high-rise building, the first foothold and the second foothold are superimposed and stand in a vertical direction, while in case that the hanger frame is axially rotated in the lower direction of the high-rise building when the fire occurs, the superimposed first foothold and second foothold are laid in a horizontal direction and unfolded so as to enable footing; and a side folding plate which has a first side plate and a second side plate which are installed to both side ends of the hanger frame and the guide frame and connected hingedly to therebetween, wherein an upper end and a lower end of the first side plate are axially rotated in a state of being axially fixed to the hanger frame, an upper end and a lower end of the second side plate are axially rotated in a state of being axially fixed to the guide frame, in ordinary day without fire risk, in case that the hanger frame extends towards the upper direction of the high-rise building, the superimposed first side plate and second side plate are inserted between the hanger frame and the guide frame, when the fire occurs, in case that the hanger frame is axially rotated in the lower direction of the high-rise building, the superimposed first side plate and second side plate are unfolded;

wherein, in ordinary day without fire risk, the foot-stepping means and the side folding plate are stacked (folded) between the hanger frame and the guide frame which stand in the upper direction of the high-rise building, to prevent the fall accident of the residents; and while when the fire occurs, the hanger frame and the guide frame are axially rotated in the lower direction of the high-rise building, and the superimposed first foothold and second foothold and the first side plate and the second side plate are unfolded such that the fire evacuee can step on the foot-stepping means and move to a lower floor.

4. The foldable balcony balustrade-combined fire/disaster evacuation facility according to claim 1, wherein, the top horizontal bar and the bottom horizontal bar which are laid in a horizontal direction with a predetermined height interval therebetween are positioned inside of and connected to the fixed frame;

wherein, a fall prevention and evacuation means holder is additionally mounted, which fixes the hanger frame equipped to the fall prevention and evacuation means and the fixed frame installed, and minimizes shaking of the fall prevention and evacuation means that is structurally changed to the emergency stairway for fire evacuation when the fall prevention and evacuation means is axially rotated to the direction of the lower floor;

wherein, the fall prevention and evacuation means holder is three-dimensional structure form and is mounted to the top horizontal bar;

wherein, the fall prevention and evacuation means holder comprises:

a L-shaped latch fitting portion having an elongated slot formed in a front side thereof;

a L-shaped latch which protrudes in a 'L'-form to an upper portion of a front side of the hanger frame;

wherein, when the fall prevention and evacuation means installed to the current floor is axially rotated to the lower floor direction by 180 degrees, the L-shaped latch mounted to the hanger frame is inserted to the long hole of the L-shaped latch fitting portion installed in the lower floor, thereby the fall prevention and evacuation means holder minimizes shaking of the fall prevention and evacuation means that is structurally changed to the emergency stairway for fire evacuation.

5. The foldable balcony balustrade-combined fire/disaster evacuation facility according to claim 1, wherein, the top horizontal bar and the bottom horizontal bar which are laid in the horizontal direction with a predetermined height interval therebetween are positioned inside of and connected to the fixed frame;

wherein, a blocking plate is installed to prevent trespassing between an upper end of the fixed frame and the top horizontal bar, and between the top horizontal bar and the bottom horizontal bar, and to the entry preventing door.

* * * * *